(12) United States Patent
Watanabe

(10) Patent No.: US 6,341,107 B1
(45) Date of Patent: *Jan. 22, 2002

(54) OPTICAL STORING APPARATUS

(75) Inventor: Ichiro Watanabe, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,384

(22) Filed: Jan. 11, 1999

(30) Foreign Application Priority Data

Jan. 13, 1998 (JP) ............................................. 10-004402
Jun. 22, 1998 (JP) ............................................. 10-175067

(51) Int. Cl.$^7$ ................................................. G11B 7/00
(52) U.S. Cl. ............................... 369/44.29; 369/44.25; 369/53.37
(58) Field of Search ........................... 369/44.25, 44.27, 369/44.28, 44.29, 44.32, 44.35, 53, 54, 124.02, 124.15, 53.27, 53.28, 53.29, 53.37; 360/77.02, 78.04, 78.08

(56) References Cited

U.S. PATENT DOCUMENTS 4,783,590 A  11/1988  Aoi
5,677,809 A  10/1997  Kadlec

FOREIGN PATENT DOCUMENTS

JP          528525       2/1993
JP          6139589      5/1994

Primary Examiner—Paul W. Huber
(74) Attorney, Agent, or Firm—Greer, Burns & Crain, Ltd.

(57) ABSTRACT

A control unit positions a laser beam toward a target track on a medium on the basis of a tracking error signal (TES) Y indicative of a positional deviation amount from a track center as a zero point on the basis of return light from the medium. A position signal correcting unit executes a correcting arithmetic operation using a non-linear function such as a quadratic polynomial, a quadratic monomial equation, or the like to the TES Y and outputs a corrected TES Z obtained by correcting detection sensitivity characteristics to desired characteristics so that a feedback is sufficiently performed when a lead-in control to the track center by the control unit is executed.

13 Claims, 24 Drawing Sheets

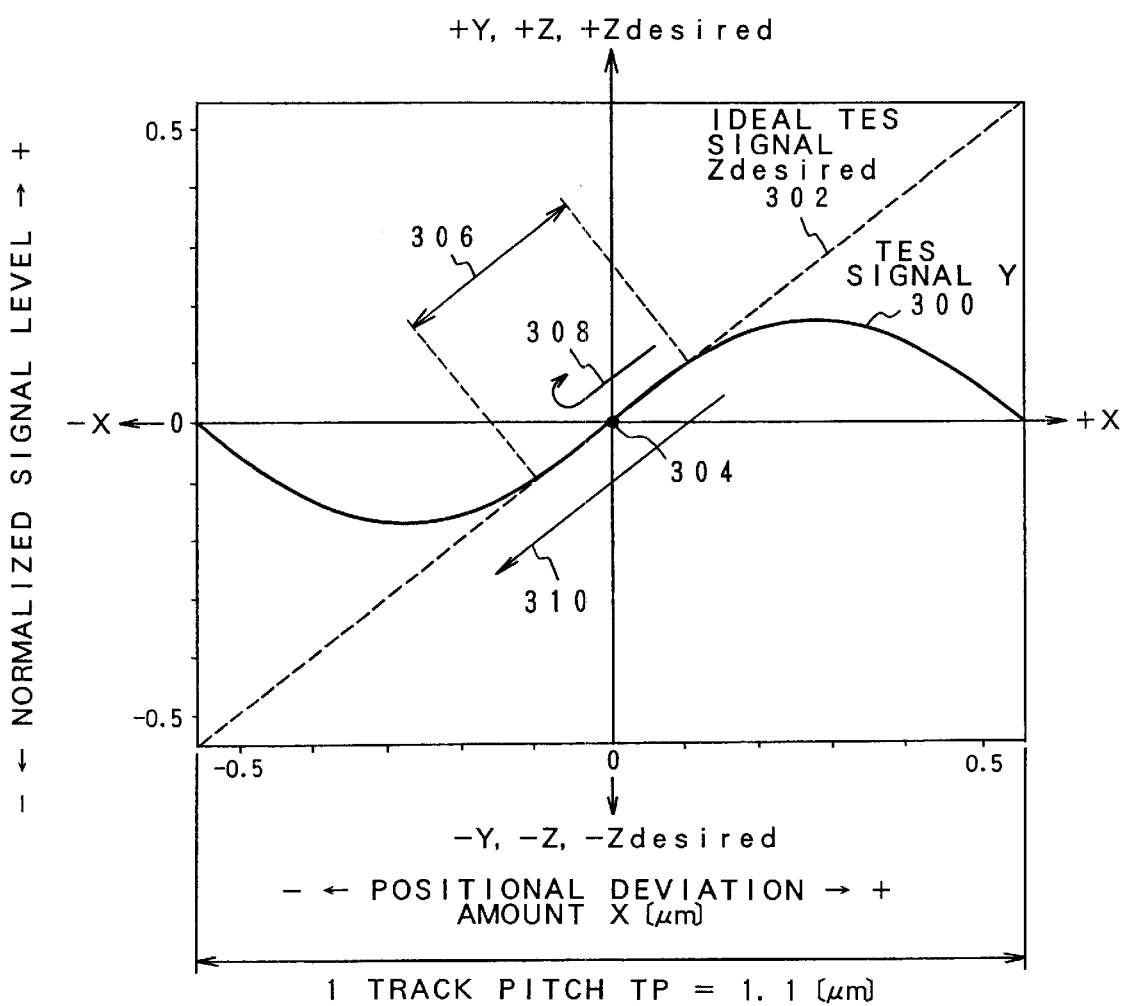

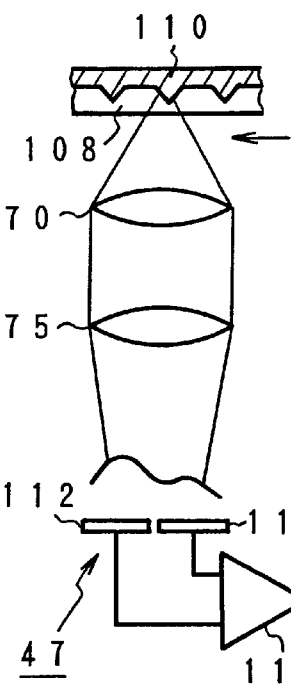 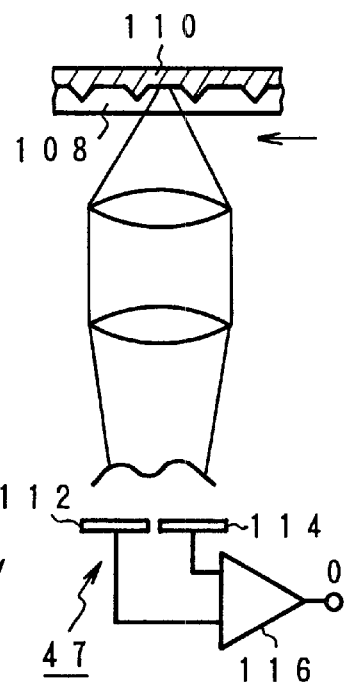 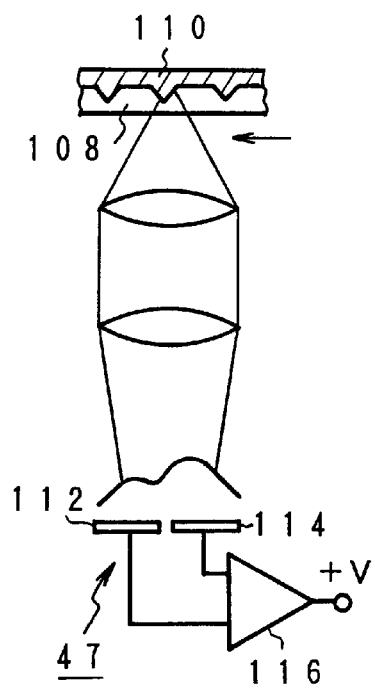
FIG. 4A   FIG. 4B   FIG. 4C
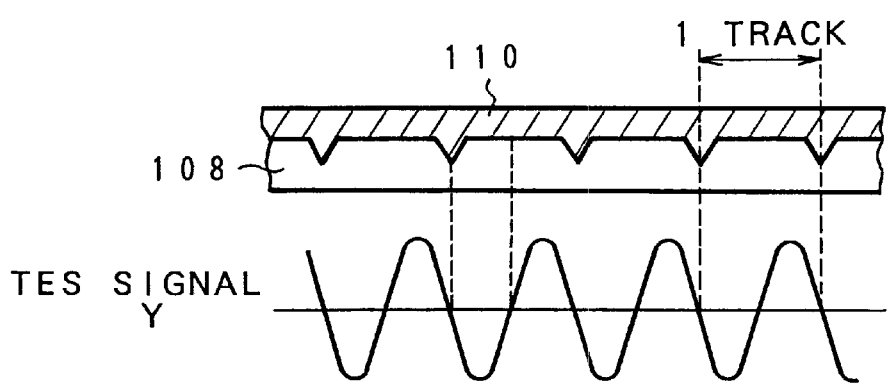
FIG. 4D

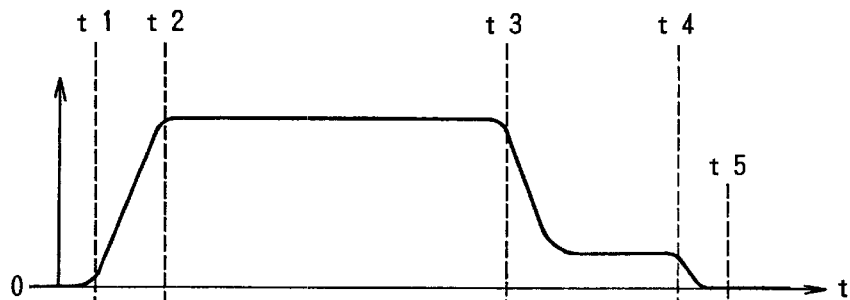
FIG. 6A BEAM SPEED
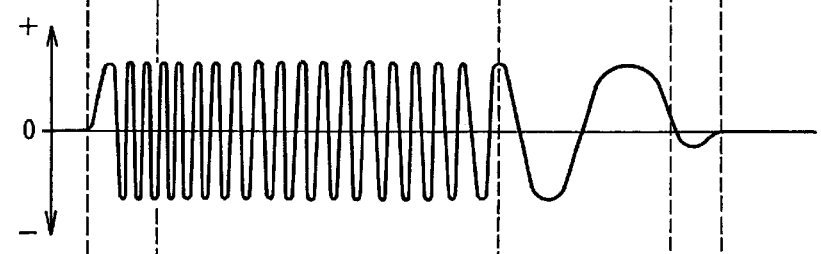
FIG. 6B TRACKING ERROR SIGNAL E1
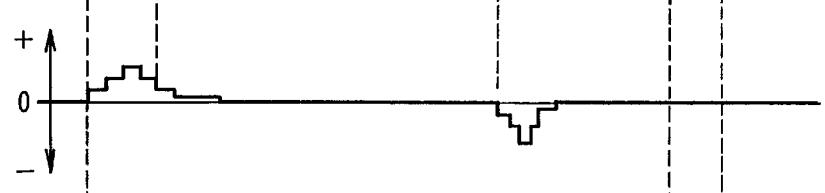
FIG. 6C VCM CURRENT Iv
FIG. 6D SPEED CONTROL (SW134)
FIG. 6E POSITION SERVO (SW158)
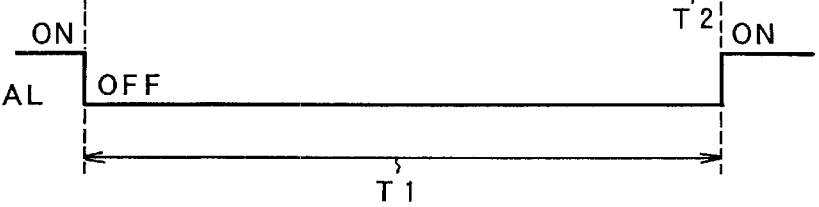
FIG. 6F ON-TRACK SIGNAL

ACTUAL POSITION ERROR X FEEDBACK

TES SIGNAL Y FEEDBACK

CORRECTED TES SIGNAL Z FEEDBACK

F I G. 13
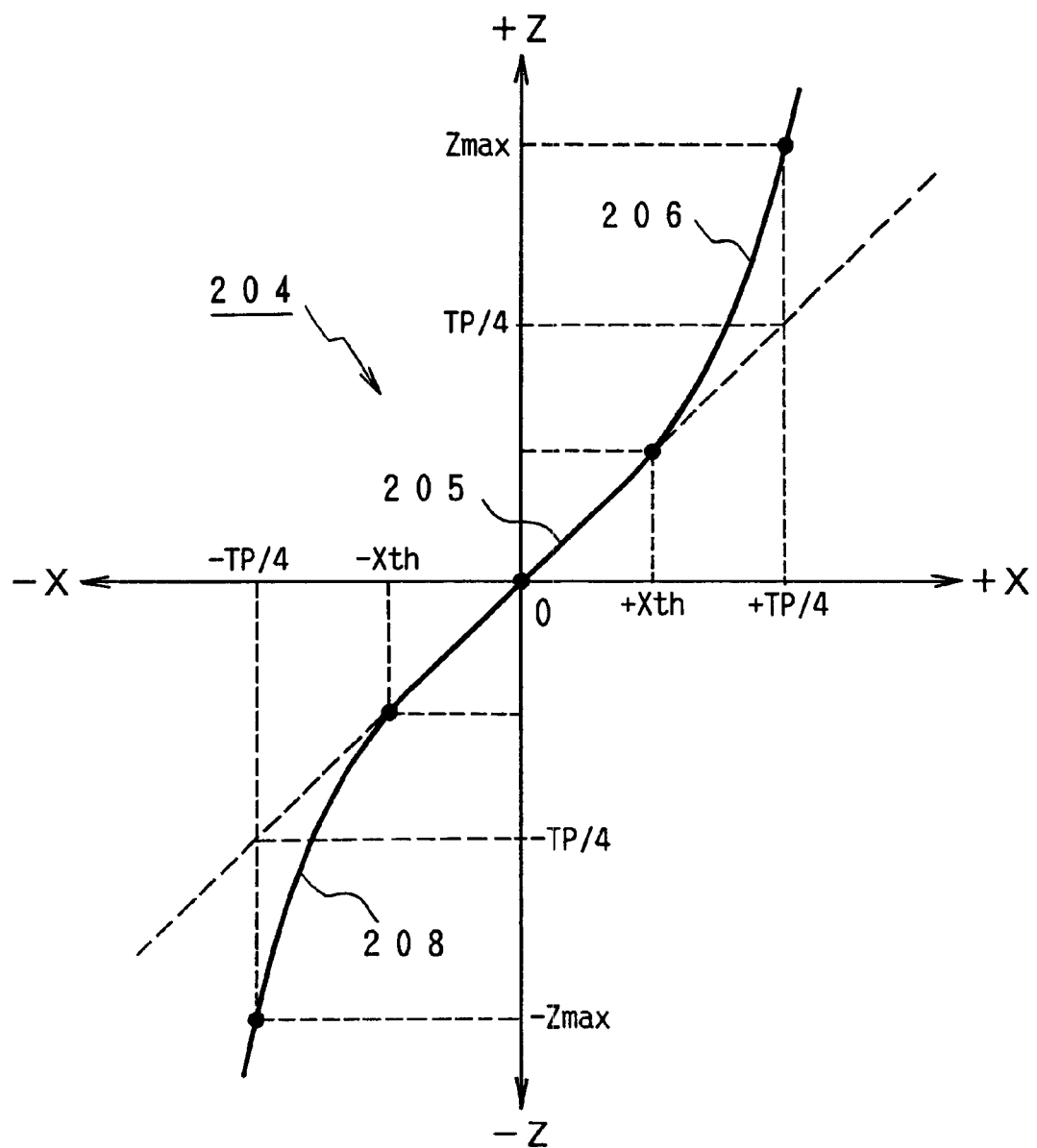

OPTICAL STORING APPARATUS

BACKGROUND OF THE INVENTION

1. Field of the Invention

The present invention relates to an optical storing apparatus from/to which information is read and written by a positioning control of a laser beam to a medium track on the basis of a tracking error signal and, more particularly, to an optical storing apparatus for correcting a tracking error signal so that a lead-in and an on-track control of a laser beam to a track center can be properly executed.

2. Description of the Related Arts

Attention is paid to an optical disk as a storing medium serving as a nucleus of multimedia which has rapidly been developing in recent years. For example, as for an MO cartridge of 3.5 inches, MO cartridges of 128 MB, 230 MB, 540 MB, 640 MB, and the like are provided. An optical disk drive using such an MO cartridge is provided as an external storing apparatus of a desktop type personal computer. Further, the use of the optical disk drive is also strongly desired in a notebook sized personal computer having an excellent portability which has rapidly become popular in recent years. In order to equip the optical disk drive as an external storing apparatus as standard equipment, therefore, a miniaturization, a thin size, and further, a low price are requested.

The optical disk drive has a pickup of a linear driving type in the direction which traverses tracks on a medium. The pickup is constructed by a fixed optical system fixed to a casing and a movable optical system which is linearly driven by a VCM. A movable optical unit mounted on a carriage is equipped with a lens actuator and has a relatively complicated mechanism which requires a two-dimensional degree of freedom such that an objective lens is moved in the direction which traverses the tracks by a current supply of a tracking coil and the objective lens is moved in the vertical direction by a current supply of a focusing coil. Such a pickup of the double driving type in which the lens actuator is mounted on the carriage performs a speed control for an acceleration, a constant speed, and a deceleration by the driving of the carriage by the VCM at the time of a seek control (coarse adjustment) for moving a beam toward a target track and executes a lead-in control for leading the beam to the target track by the driving of the lens actuator when the laser beam approaches the target track. After completion of the lead-in to the target track, the beam is allowed to trace the target track by the positioning control of the lens actuator and, simultaneously, to trace a medium eccentricity or the like by the driving of the carriage by the VCM. The structure of the pickup mechanism of the double driving type in which the lens actuator is mounted on the carriage is, however, complicated and the beam positioning control is also complicated since the control of the carriage and that of the lens actuator are combined, so that there are limitations to realize the miniaturization, thin size, and reduction in costs of the pickup. There is, accordingly, a pickup of a single driving type for executing all of the seek control for moving the beam toward the target track, the lead-in control for the target track, and the tracking control for the target track after completion of the lead-in only by the driving of the carriage by the VCM without using the tracking actuator. In the pickup of the single driving type, it is sufficient to mount simple parts such as objective lens, focusing actuator, and the like onto the carriage. Consequently, the carriage can be made small and thin, its mass can be sufficiently reduced, and an inertia occurring by the carriage movement can be reduced as compared with the double driving type in which the lens actuator is mounted, so that a high trace response speed can be obtained. Since it is sufficient to perform only the control by the VCM, there is an advantage such that the seek control, the target track lead-in control, and the tracking control can be also realized by simple control systems and enough reduction in costs can be expected as a result.

On the other hand, in the optical disk drive, arbitrary tracks on the optical disk are accessed at random. In this instance, in order to read information stored on the optical disk or write information to the optical disk, it is necessary to execute a tracking control for accurately positioning the laser beam toward the target track at a high speed. For the purpose of the tracking control, in the optical disk drive, a tracking error signal (hereinbelow, called a "TES") is optically detected. As a method of obtaining the TES in the optical disk apparatus, a push-pull method (far field method) in which detecting sensitivity is high and a signal is obtained by a single beam and an optical system and a circuit are simple is used. The TES signal which is obtained by the push-pull method is a signal obtained by optically and indirectly detecting a deviation (positional error) between the track center and the laser beam by using an interference of the light. The tracking control based on the TES in the single driving type pickup is executed as follows. In the seek control for moving the laser beam to the target track, the speed of the carriage is controlled by the driving of the VCM. That is, a speed control such that a target speed is set in accordance with the number of remaining tracks to the target track and, after acceleration, the target speed is maintained is executed. During the speed control, a down-count such that the number of tracks is obtained by detecting a zero-crossing point of the TES and the number of remaining tracks to the target track is obtained is performed. When the number of remaining tracks to the target track is reduced to a specified value, the control is switched to the deceleration control. When the laser beam approaches a position just before the target track during the deceleration control, the control is switched to a position servo control based on the TES, the VCM is feedback controlled so that the TES is set to zero, and the beam is led to the target track. When the lead-in to the target track is succeeded, an on-track signal is obtained, and the seeking operation is completed. In a state where the laser beam is allowed to trace the track center by the tracking control (on-track control), the reading operation or writing operation from/to the optical disk is permitted. In the tracking control, since the TES is equal to zero at the track center, the carriage is driven by the VCM by the feedback control for always setting the TES to zero. Even if there is a positional fluctuation of the target track due to a disk rotational eccentricity or the like, the laser beam is always allowed to trace the track center.

A desirable position signal having a proportional relation for a physical positional deviation amount (distance) X of a light spot (laser spot) of the laser beam from the track center is set to an ideal TES $Z_{desired}$. The TES is, so to speak, merely a signal obtained by performing a modulation by the interference of light to the ideal TES $Z_{desired}$. The magnitude of the TES and the actual positional deviation amount X, therefore, do not always have the proportional relation. This is because the positional error is detected as a TES by using the interference of light and is a phenomenon caused by the nature of the TES which is obtained by the push-pull method.

FIG. 1 shows the ideal TES $Z_{desired}$ and a TES Y for the actual positional deviation amount X with respect to a case where a track pitch TP=1.1 μm. The positional deviation amount X of the axis of abscissa is equal to X=0 at the track center and has a width of ±0.55 μm in the lateral direction. As a normalized signal level of an axis of ordinates, a value obtained by converting the level of the TES Y by the track pitch TP=1.1 μm is used. Y=0 at the track center and a range of ±0.55 μm in the vertical direction is shown. The relation between the positional deviation amount X and the TES Y in FIG. 1 shows an almost sine wave 300 and can be approximated by, for example, the following equation.

$$Y=(TP/2\pi)\sin\{(2\pi/TP)\cdot X\}$$

On the other hand, the ideal TES $Z_{desired}$ having the proportional relation with the actual positional deviation amount X shows a straight line 302 and is obtained by $$Z_{desired}=K\cdot X$$

As will be understood from FIG. 1, the ideal TES $Z_{desired}$ of the straight line 302 is proportional to the actual positional deviation amount X and linearly changes. On the other hand, although the TES Y which changes like a sine wave 300 almost traces the ideal TES $Z_{desired}$ of the straight line 302 in a range 306 around a positional deviation amount X=0 serving as a track center as a center, when the TES Y is out of the range 306, it does not trace the ideal TES $Z_{desired}$ and is saturated.

The lead-in control of the laser beam to the target track is executed by starting the feedback control of a position servo to set the TES to zero when the laser beam reaches a position just before the target track during the deceleration by the speed control. In the lead-in control, as an initial state when the position servo feedback is turned on, if both of the positional error and a relative speed between the laser beam and the target track center are zero, respectively, the lead-in to the track center is certainly succeeded and the control can be shifted to the tracking control. In designing, for example, parameters of the seek control are determined so as to satisfy such optimum initial conditions. In the actual operating state, however, there are often a positional error and a speed error in the initial conditions just before the lead-in by various disturbances due to a vibration, a temperature fluctuation, and the like. In this case, when the beam speed at the start of the lead-in is low, as shown by an arrow 308 in FIG. 1, after the laser beam passed the track center corresponding to a point 304 where the positional deviation amount X=0 the deceleration is sufficiently performed by the feedback control of the VCM according to the magnitude of the TES Y, the TES Y stops in the range 306 where it coincides with the ideal TES $Z_{desired}$, and the laser beam can be led to the track center. When the beam speed at the lead-in start time is high, however, as shown by an arrow 310, the TES Y after that the laser beam passed the point 304 corresponding to the track center exceeds the range 306 where the TES Y coincides with the ideal TES $Z_{desired}$. The TES Y is deviated into a range where it is saturated. At this position, the feedback amount of the VCM according to the magnitude of the TES Y is insufficient and the deceleration cannot be sufficiently performed, so that the laser beam cannot be returned to the target track center and the lead-in fails. When the lead-in fails, after executing a predetermined error process, it is necessary to perform the seek control again, so that the accessing performance deteriorates. Especially, in the single driving type pick-up, since the lead-in control is executed in the carriage itself, the servo band width of the lead-in control cannot be made sufficiently high, the feedback control of the TES for the carriage speed at the lead-in start time is hard to be effected, a probability of a lead-in failure rises, and it is one of causes of the deterioration of the accessing performance as compared with the lead-in control by the lens actuator of the double driving type pickup.

SUMMARY OF THE INVENTION

According to the invention, there is provided an optical storing apparatus in which even if there is a variation in a carriage speed, a lead-in control of a target track to the center can be certainly performed and the number of times of the recovering operation which is caused by a lead-in failure is decreased, thereby reducing an access time.

According to the invention, an optical storing apparatus comprises: a pickup for moving an irradiating position of a laser beam to an arbitrary track position of a medium; an information signal processing unit for reproducing at least information to the medium by the laser beam; a position signal detecting unit for detecting a position signal Y according to a positional deviation amount X in which a track center of the medium is set to 0 on the basis of return light of the laser beam from the medium; a position signal correcting unit for outputting a corrected position signal Z obtained by correcting detection sensitivity characteristics for the positional deviation amount to desired characteristics by performing a correcting arithmetic operation using a predetermined non-linear function on the basis of the position signal Y; and a positioning control unit for performing a tracking control such that the laser beam is moved toward a target track of the medium and the laser beam is lead-in controlled to the center of the target track on the basis of the corrected position signal Z by switching a control mode to a position servo control at a position just before the target track and the laser beam is allowed to trace the target track after completion of the lead-in control. With respect to such an optical storing apparatus, the invention is characterized by comprising a position signal correcting unit for outputting a corrected position signal Z obtained by correcting detection sensitivity characteristics for the positional deviation amount to desired characteristics by performing a correcting arithmetic operation using a predetermined non-linear function to the position signal Y.

According to the position signal correcting unit, in a position range where the sensitivity of the position signal Y detected by the position signal detecting unit deteriorates for an ideal position signal $Z_{desired}$ to a change of the actual positional deviation amount X of the laser beam, by performing a correcting arithmetic operation using a predetermined non-linear function to the position signal Y, the sensitivity is increased, thereby outputting the corrected position signal Z approximated to the ideal position signal $Z_{desired}$. As for the corrected position signal Z corrected by the position signal correcting unit, at the time of the lead-in control of the target track to the track center, an enough feedback amount can be obtained by the correction, even if an initial speed at the start of the lead-in is high, the laser beam can be certainly led to the track center.

When an absolute value |Y| of the position signal Y detected by the position signal detecting unit is equal to or larger than a predetermined threshold value $Y_{th}$, the position signal correcting unit performs the correcting arithmetic operation using the predetermined non-linear function to the position signal Y, thereby calculating the corrected position signal Z.

When it is assumed that the ideal position signal $Z_{desired}$ has linear characteristics of $$Z_{desired} = K \cdot X$$

the position signal correcting unit sets an Nth order polynomial such as $$Z = a_N Y^N + a_{N-1} Y^{N-1} + \ldots + a_2 Y^2 + a_1 Y + a_0$$

as a non-linear function which is used for the correction, substitutes the position signal Y for the Nth order polynomial, and calculates the corrected position signal Z. As mentioned above, the ideal TES $Z_{desired}$ is defined and the corrected position signal Z is obtained from the position signal Y by forming a correcting function for converting so as to approximate to or coincide with the ideal TES. Therefore, the continuity of a gain due to the corrected position signal Z at positions before and after the threshold value $Y_{th}$ is not lost, an excitation of an oscillation due to a fact that the gain is discontinuously switched is not caused, and a stable feedback control can be performed. Specifically speaking, now assuming that the threshold value $Y_{th}$ is set to a predetermined value that is equal to or smaller than a maximum amplitude $Y_{max}$ of the position signal Y, I. In a range ($|Y| \leq Y_{th}$) where the absolute value $|Y|$ of the position signal Y is equal to or smaller than the threshold value $Y_{th}$, the correction position signal Z is calculated by $$Z = Y$$

II. In a range ($Y_{th} < Y$) where the position signal Y exceeds the positive threshold value $Y_{th}$, the corrected position signal Z is calculated by substituting the position signal Y into the following Nth order polynomial.

$$Z = a_N Y^N + a_{N-1} Y^{N-1} + \ldots + a_2 Y^2 + a_1 Y + a_0$$

III. Further, in a range ($Y < -Y_{th}$) where the position signal Y is smaller than the negative threshold value $-Y_{th}$, the corrected position signal Z is calculated by substituting the position signal Y into the following equation.

$$Z = -(a_N |Y|^N + a_{N-1} |Y|^{N-1} + \cdots + a_2 |Y|^2 + a_1 |Y| + a_0)$$

Practically, the position signal correcting unit calculates the corrected position signal Z by substituting the position signal Y detected by the position signal detecting unit into the following quadratic polynomial.

$$Z = -a_2 Y^2 + a_1 Y + a_0$$

That is, in a range ($Y_{th} < Y$) where the position signal Y exceeds the positive threshold value $Y_{th}$, the corrected position signal Z is calculated by substituting the position signal Y into the following quadratic polynomial.

$$Z = a_2 Y^2 + a_1 Y + a_0$$

In a range ($Y < -Y_{th}$) where the position signal Y is smaller than the negative threshold value $-Y_{th}$, the corrected position signal Z is calculated by substituting the position signal Y into the following expression.

$$Z = -(a_2 Y^2 + a_1 |Y| + a_0)$$

As an ideal position signal $Z_{desired}$, the position signal correcting unit sets the linear characteristics of $$Z_{desired} = K_{XZ} \cdot X$$

As another ideal position signal $Z_{desired}$, in a range ($|X| X_{th}$) where an absolute value $|X|$ of the positional deviation amount X is equal to or smaller than a threshold value $X_{th}$, the position signal correcting unit sets the linear characteristics of $$Z_{desired} = K_{XZ} \cdot X$$

In a range ($X_{th} < X$) where the positional deviation amount X exceeds the positive threshold value $X_{th}$, the unit sets the non-linear characteristics of $$Z_{desired} = K_{XZ} \cdot X + K_{NL}(X - X_{th})^n$$

Further, in a range ($X < -X_{th}$) where the positional deviation amount X is smaller than the negative threshold value $-X_{th}$, the unit sets the non-linear characteristics of $$Z_{desired} = -\{K_{XZ} \cdot |X| + K_{NL}(=|X| - X_{th})^n\}$$

and coefficients $a_2$, $a_1$, and $a_0$ of the quadratic polynomial are decided so as to be approximated to the ideal position signal $Z_{desired}$ of the non-linear characteristics. It is also possible that the non-linear function in the position signal correcting unit is prepared as a table in an RAM (or an ROM) and the correction is performed by referring to the table.

According to a modification of the invention, the position signal correcting unit sets the Nth order monomial equation as a non-linear function and calculates the corrected position signal Z by substituting the position signal Y into the Nth order monomial equation, thereby easily raising the detecting sensitivity. That is, now assuming that the threshold value $Y_{th}$ is equal to a value ($Y_{max} \cdot K_{th}$) obtained by multiplying the maximum amplitude $Y_{max}$ of the position signal Y by a positive coefficient $K_{th}$ which is equal to or less than 1, I. In a range ($|Y| \leq Y_{th}$) where the absolute value $|Y|$ of the position signal Y is equal to or smaller than the threshold value $Y_{th}$, the position signal correcting unit calculates the corrected position signal Z by $$Z = Y$$

II. In a range ($Y_{th} < Y$) where the position signal Y exceeds the positive threshold value ($Y_{th}$, the position signal correcting unit calculates the corrected position signal Z by substituting the position signal Y into the following Nth order monomial equation.

$$Z = Y^N / Y_{th}^{(N-1)}$$

III. In a range ($Y < -Y_{th}$) where the position signal Y is smaller than the negative threshold value $-Y_{th}$, the corrected position signal Z is calculated by substituting the position signal Y into $$Z = -|Y|^N / Y_{th}^{(N-1)}$$

Practically, the position signal correcting unit can also calculate the corrected position signal Z in the following manner.

In a range ($Y_{th} < Y$) where the position signal Y exceeds the positive threshold value $Y_{th}$, the corrected position signal Z is calculated by substituting the position signal Y into the following quadratic monomial equation.

$$Z = Y^2 / Y_{th}$$

In a range ($Y < -Y_{th}$) where the position signal Y is smaller than the negative threshold value $-Y_{th}$, the corrected position signal Z is calculated by substituting the position signal Y into the following quadratic monomial equation.

$$Z = -Y^2/Y_{th}$$

On the other hand, in a range ($Y_{th} < Y$) where the position signal Y exceeds the positive threshold value $Y_{th}$, the corrected position signal Z is calculated by substituting the position signal Y into the following cubic monomial equation.

$$Z = Y^3/Y_{th}^2$$

In a range ($Y < -Y_{th}$) where the position signal Y is smaller than the negative threshold value $-Y_{th}$, the corrected position signal Z is calculated by substituting the position signal Y into the following cubic monomial equation.

$$Z = -|Y|^3/Y_{th}^2$$

In case of the cubic monomial equation, since the position signal Y is positive in a range ($Y_{th} < Y$) where the position signal Y exceeds the positive threshold value $Y_{th}$, the cubic monomial equation becomes $$Z = Y^3/Y_{th}^2$$

Since the position signal Y is negative in a range ($Y < -Y_{th}$) where the position signal Y is smaller than the negative threshold value $-Y_{th}$, the cubic monomial equation similarly becomes $$Z = Y^3/Y_{th}^2$$

That is, in case of the cubic monomial equation, since $Y^3$ is an odd monomial equation, even in the case where the position signal Y lies within the range ($Y_{th} < Y$) and the case where it lies within the range of ($Y < -Y_{th}$), the cubic monomial equations become $$Z = Y^3/Y_{th}^2.$$

The above and other objects, features, and advantages of the present invention will become more apparent from the following detailed description with reference to the drawings.

BRIEF DESCRIPTION OF THE DRAWINGS

FIG. 1 is a characteristic diagram showing a TES Y together with an ideal TES $Z_{desired}$;

FIGS. 4A to 4D are principle explanatory diagrams of a far field method which is used for detection of the TES in the invention;

FIGS. 6A to 6F are time charts for a seek control by the positioning control unit in FIG. 5;

FIG. 13 is a characteristic diagram showing representatively the ideal TES $Z_{desired}$ in FIG. 12 which has been set to improve convergence time;

DETAILED DESCRIPTION OF THE PREFERRED EMBODIMENT (Hardware construction and structure)

Figure 2A:
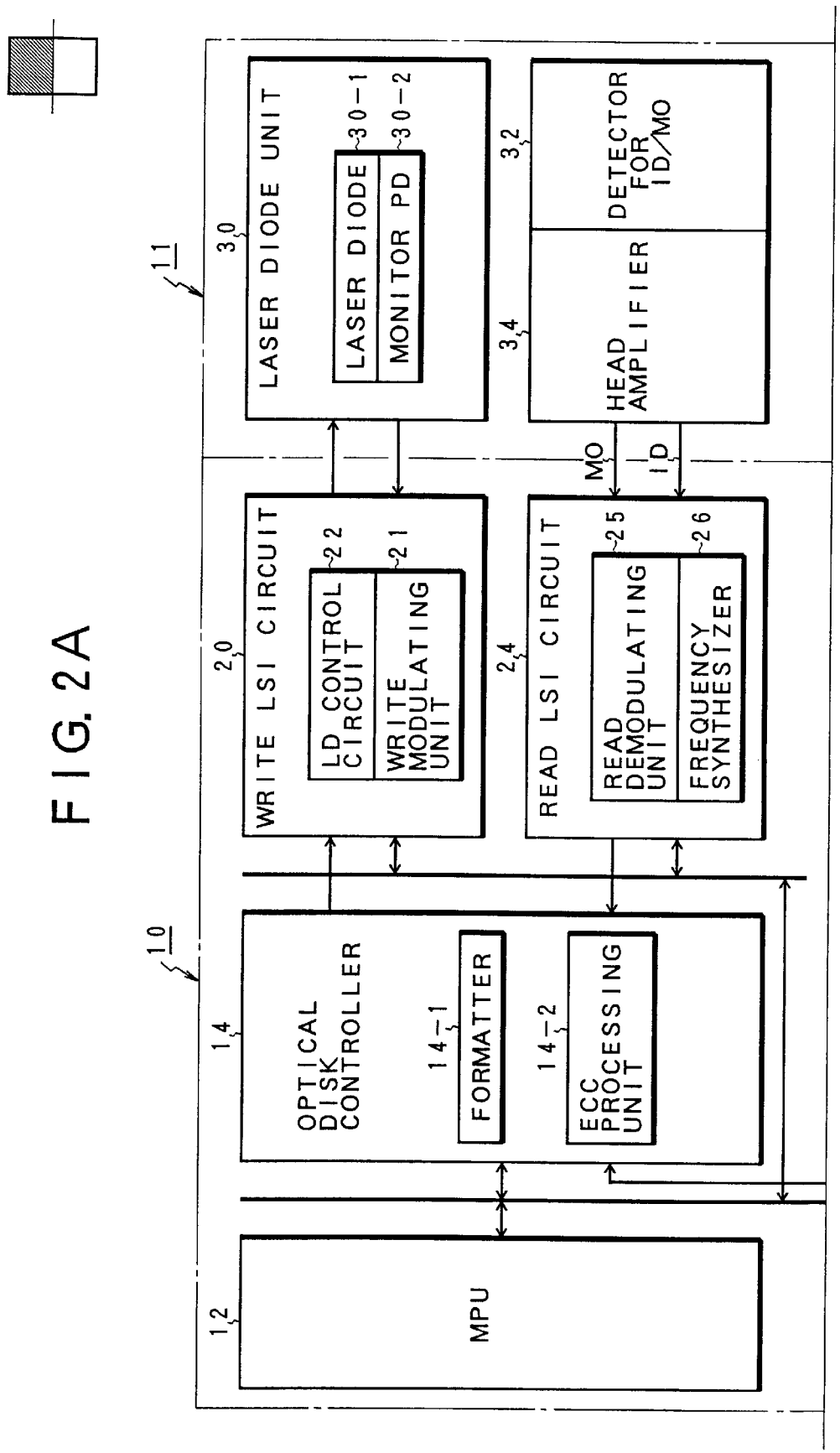
FIGS. 2A and 2B are block diagrams of an optical disk drive to which the invention is applied.
Figure 2B:
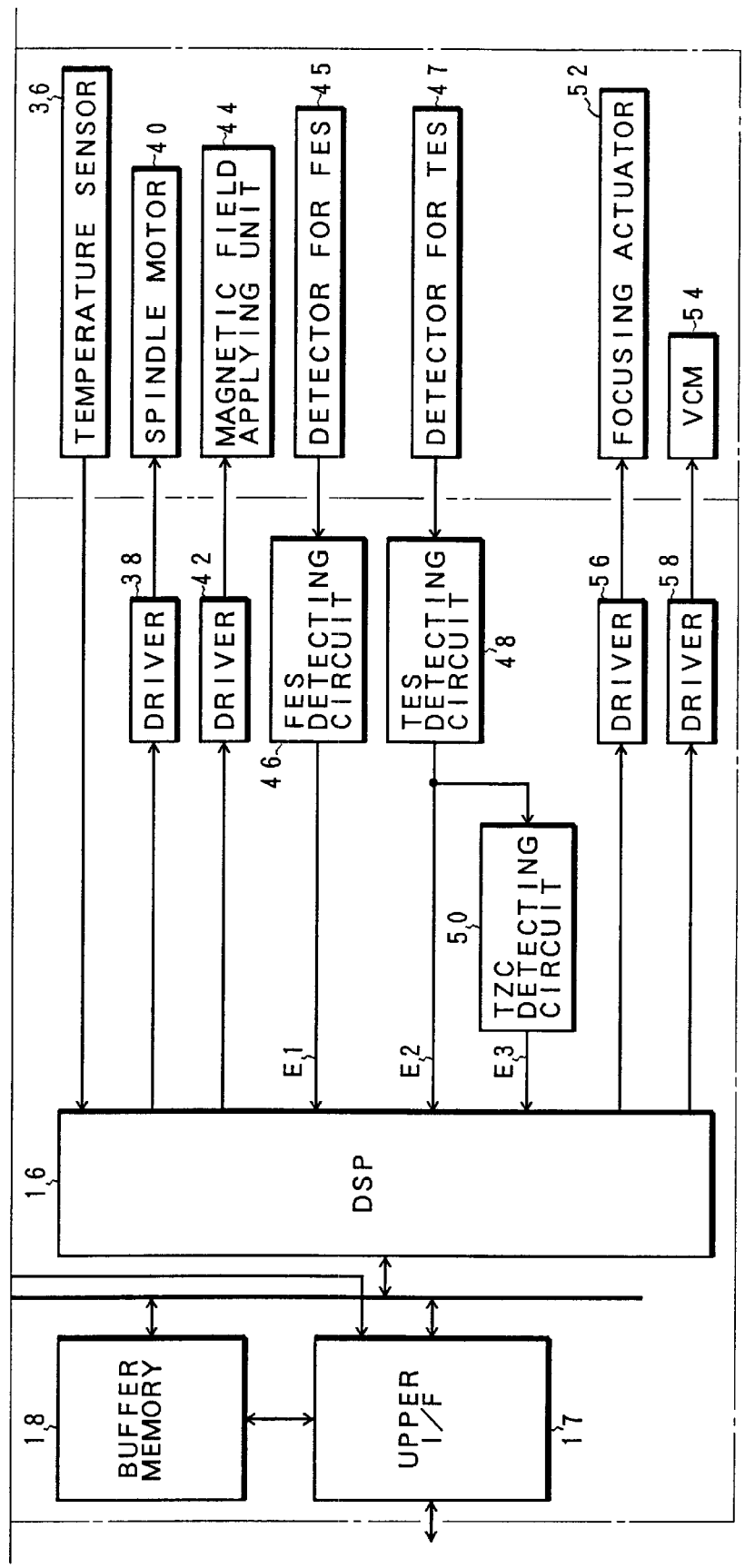

FIGS. 2A and 2B show an optical storing apparatus of the invention and show an optical disk drive as an example. The optical disk drive of the invention comprises a control unit 10 and an enclosure 11. The control unit 10 has an MPU 12 for performing a whole control of the optical disk drive, an interface 17 for transmitting and receiving commands and data to/from an upper apparatus, an optical disk controller (ODC) 14 for performing processes which are necessary to read and write data from/to an optical disk medium, a DSP 16, and a buffer memory 18. The buffer memory 18 is commonly used for the MPU 12, optical disk controller 14, and upper interface 17. A formatter 14-1 and an ECC processing unit 14-2 are provided for the optical disk controller 14. At the time of a write access, the formatter 14-1 divides NRZ write data on a sector unit basis of the medium and forms a recording format and the ECC processing unit 14-2 forms an ECC code on a sector write data unit basis and adds and, if necessary, forms a CRC code and adds. Further, sector data after completion of an ECC encoding is converted into, for example, a 1–7 RLL code. At the time of a read access, sector read data is inversely 1–7 RLL converted. Subsequently, in the ECC processing unit 14-2, a CRC check is performed and, thereafter, an error detection and correction are performed. Further, in the formatter 14-1, the NRZ data of the sector unit is coupled and resultant data is transferred to the upper apparatus as a stream of NRZ read data. A write LSI circuit 20 is provided for the optical disk controller 14. A write modulating unit 21 and a laser diode control circuit 22 are provided for the write LSI circuit 20. A control output of the laser diode control circuit 22 is supplied to a laser diode unit 30 provided for an optical unit on the enclosure 11 side. The laser diode unit 30 integratedly has a laser diode 30-1 and a detector 30-2 for monitoring. The write modulating unit 21 converts write data into a data format in a PPM recording or a PWM recording (also referred to as a mark recording or edge recording). As an optical disk for performing the recording and reproduction by using the laser diode unit 30, namely, as a rewritable MO cartridge medium, in the embodiment, any one of the media of 128 MB, 230 MB, 540 MB, and 640 MB can be used. With respect to the MO cartridge medium of 128 MB, the pit position recording (PPM recording) in which data is recorded in correspondence to the presence or absence of a mark on the medium is used. A recording format of the medium is a zone CAV and the number of zones of a user area is set to one zone for the 128 MB medium. As for the MO cartridge media of 230 MB, 540 MB, and 640 MB serving as a high density recording, the pulse width recording (PWM recording) in which edges of a mark, namely, a leading edge and a trailing edge are made correspond to data is used. A difference between memory capacities of the 640 MB medium and the 540 MB medium is caused by a difference between the sector capacities. When the sector capacity is equal to 2048 bytes, the memory capacity is equal to 640 MB. When the sector capacity is equal to 512 bytes, it is equal to 540 MB. The recording format of the medium is the zone CAV and the number of zones of the user area is equal to 10 zones in case of the 230 MB medium, 18 zones in case of the 540 MB medium, and 11 zones in case of the 640 MB medium. As mentioned above, the optical disk drive of the invention can cope with the MO cartridges of memory capacities of 128 MB, 230 MB, 540 MB, and 640 MB and, further, the direct overwrite corresponding MO cartridges of memory capacities of 230 MB, 540 MB, and 640 MB. When an MO cartridge is loaded into the optical disk drive, therefore, an ID portion of the medium is first read, the kind of medium is recognized from a pit interval by the MPU 12, and a kind result is notified to the optical disk controller 14. As a reading system for the optical disk controller 14, a read LSI circuit 24 is provided. A read demodulating unit 25 and a frequency synthesizer 26 are built in the read LSI circuit 24. A photosensing signal of the return light of a beam from the laser diode 30-1 by a detector 32 for ID/MO provided for the enclosure 11 is inputted as an ID signal and an MO signal to the read LSI circuit 24 through a head amplifier 34. Circuit functions of an AGC circuit, a filter, a sector mark detecting circuit, and the like are provided for the read demodulating unit 25 of the read LSI circuit 24. The read demodulating unit 25 forms a read clock and read data from the inputted ID signal and MO signal and demodulates PPM data or PWM data to the original NRZ data. Since the zone CAV is used, a setting control of a frequency dividing ratio for generating a zone corresponding clock frequency is performed from the MPU 12 to the frequency synthesizer 26 built in the read LSI circuit 24. The frequency synthesizer 26 is a PLL circuit having a programmable frequency divider and generates a reference clock, as a read clock, having a predetermined peculiar frequency in accordance with a zone position on the medium. That is, the frequency synthesizer 26 is constructed by a PLL circuit having a programmable frequency divider and generates a reference clock of a frequency fo according to the frequency dividing ratio (m/n) set by the MPU 12 in accordance with the zone number in accordance with the following equation.

$$fo = (m/n) \cdot fi$$

where, a frequency division value (n) of a denominator of the frequency dividing ratio (m/n) is a peculiar value according to the kind of medium of 128 MB, 230 MB, 540 MB, or 640 MB. A frequency division value (m) of a numerator is a value which changes in accordance with the zone position on the medium and is prepared as table information of a value corresponding to the zone number with respect to each medium. The read data demodulated by the read LSI circuit 24 is supplied to the reading system of the optical disk controller 14 and is subjected to the inverse conversion of 1–7 RLL. After that, a CRC check and an ECC process are performed by an encoding function of the ECC processing unit 14-2, so that the NRZ sector data is reconstructed. Subsequently, it is converted by the formatter 14-1 to a stream of the NRZ read data to which the NRZ sector data is coupled and this stream is transferred to the upper apparatus via the buffer memory 18 by the upper interface 17. A detection signal of a temperature sensor 36 provided on the enclosure 11 side is supplied to the MPU 12 through the DSP 16. The MPU 12 controls each of the light emitting powers for reading, writing, and erasing in the laser diode control circuit 22 to an optimum value on the basis of an environment temperature of the unit in the apparatus which was detected by the temperature sensor 36.

The MPU 12 controls a spindle motor 40 provided on the enclosure 11 side by a driver 38 via the DSP 16. Since the recording format of the MO cartridge is the zone CAV, the spindle motor 40 is rotated at a constant velocity of, for example, 3000 rpm. The MPU 12 also controls a magnetic field applying unit 44 using an electromagnet provided on the enclosure 11 side by a driver 42 through the DSP 16. The magnetic field applying unit 44 is arranged on the side opposite to the beam irradiating side of the MO cartridge loaded in the apparatus and supplies an external magnetic field to the medium upon recording and erasing. The DSP 16 has a servo function to position the beam from the laser diode 30-1 to the medium and functions as a seek control unit and a tracking control unit for seeking the laser beam toward a target track (on-track). The seek control and tracking control can be simultaneously executed in parallel with the write access or read access in response to an upper command by the MPU 12. To realize the servo function of the DSP 16, a detector 45 for FES to receive the beam return light from the medium is provided for the optical unit on the enclosure 11 side. An FES detecting circuit (focusing error signal detecting circuit) 46 forms a focusing error signal E1 from a photosensing output of the detector 45 for FES and supplies to the DSP 16. A detector 47 for TES to receive the beam return light from the medium is provided for the optical unit on the enclosure 11 side. A TES detecting circuit (tracking error signal detecting circuit) 48 forms a tracking error signal E2 from a photosensing output of the detector 47 for TES and supplies to the DSP 16. In the embodiment, the tracking error signal E2 is formed by a far field method. The tracking error signal E2 is inputted to a TZC detecting circuit (track zero-cross point detecting circuit) 50. The TZC detecting circuit forms a track zero-cross pulse E3 and supplies to the DSP 16. Further, to control the position of the beam spot on the medium, the DSP 16 controls a focusing actuator 52 and a VCM 54 through drivers 56 and 58.

Figure 3:
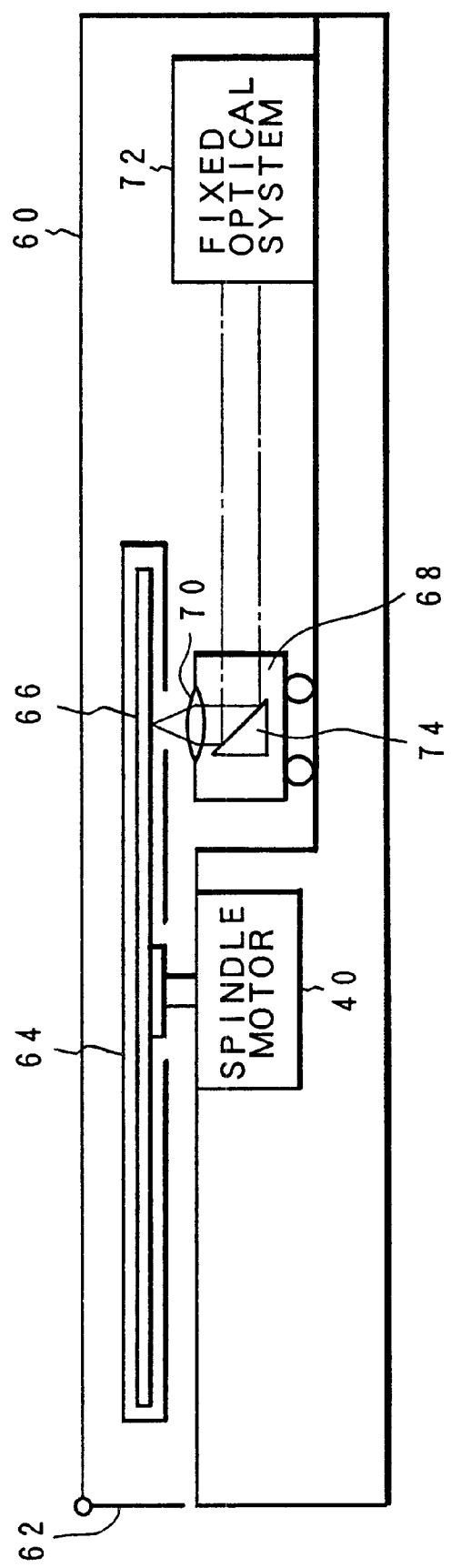
FIG. 3 is an explanatory diagram of an internal structure of the optical disk drive in FIGS. 2A and 2B.

An outline of the enclosure 11 in the optical disk drive is as shown in FIG. 3. The spindle motor 40 is provided in a housing 60. By inserting an MO cartridge 64 from an inlet door 62 side to a hub of a rotary shaft of the spindle motor 40, a loading such that an internal MO medium 66 is attached to the hub of the rotary shaft of the spindle motor 40 is performed. A carriage 68 which is movable in the direction traversing the tracks on the medium by the VCM 54 is provided under the MO medium 66 of the loaded MO cartridge 64. An objective lens 70 is fixed onto the carriage 68, enters the beam from the laser diode provided for a fixed optical system 72 through a leading mirror 74, and forms an image of the beam spot onto the surface of the MO medium 66. The objective lens 70 is moved in the optical axial direction by the focusing actuator 52 shown in the enclosure 11 in FIGS. 2A and 2B. The objective lens can be also moved in the radial direction traversing the tracks on the medium by the linear driving of the carriage 68 by the VCM 54. As a pickup mechanism of the single driving type, for example, a mechanism disclosed in JP-A-9-54960 or the like can be used.

FIGS. 4A to 4D show a detecting principle of the TES by the detector 47 for TES and TES detecting circuit 48 in FIGS. 2A and 2B. The TES is optically detected from the optical disk and is a position signal showing a positional deviation amount X in the case where a light point (laser spot) of the laser beam to record or reproduce information to/from the optical disk is deviated from the center of the track on the optical disk. The TES is detected by, for instance, a far field method. As shown in FIGS. 4A to 4C, according to the far field method, when the laser beam is irradiated in a state where an optical disk 108 is moving in the direction of an arrow, the return light from the surface of the optical disk 108 causes an interference on the detector 47 having two-split photosensing units 112 and 114 through the objective lens 70 and a convergent lens 75 due to the existence of a guide groove 110. Thus, a bright/dark pattern according to the positional deviation amount X between the center of the track where recording pits are formed and the light spot of the laser beam (center of the light) is caused on the detector 47. The TES is detected by a differential amplifier 116 as a difference between photosensing outputs of the two-split photosensing units 112 and 114, so that a TES Y as shown in FIG. 4D is obtained. As for the TES Y, the positional deviation amount (positional error) X between the track center and the light spot of the laser beam is detected by using the interference of light. The TES Y=0 at the center of the guide groove 110 and at the track center and periodically changes like an almost sine waveform in correspondence to one track of the optical disk 108. Therefore, the actual positional deviation amount X which linearly changes and the TES Y which is obtained by the far field method differ to the end.

According to the far field method, since a structure of the optical system is simpler and precision is higher as compared with those of the 3-beam method or the like in the CD (compact disc) so far, the far field method is widely used as a detecting method of the TES in a rewritable optical disk. The invention is also effectively applied to the 3-beam method.

(Positioning control)

Figure 5:
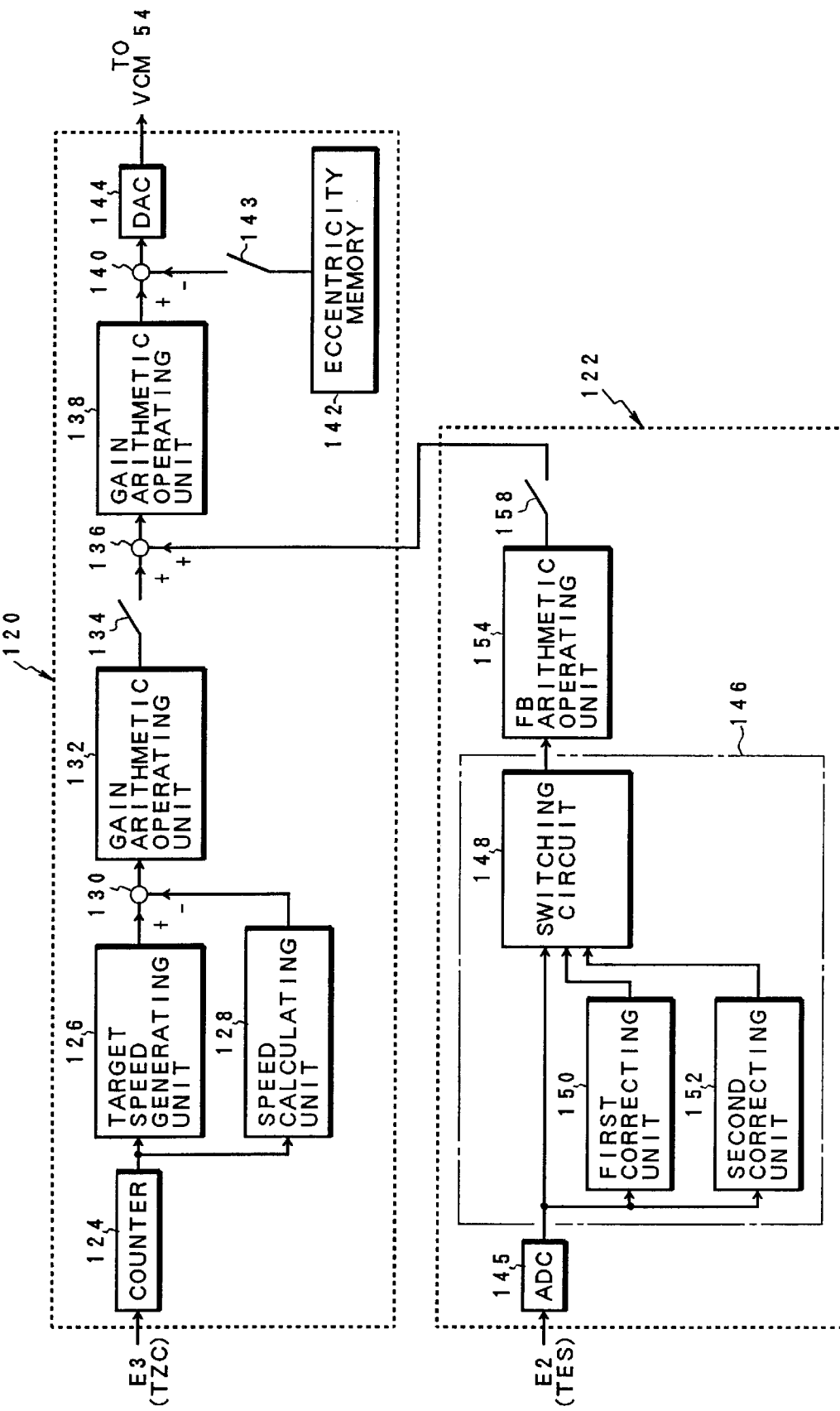
FIG. 5 is a block diagram of a positioning control unit of the invention which is realized by a DSP in FIGS. 2A and 2B.

FIG. 5 is a functional block diagram of a positioning control of the laser beam for the pickup, as a target, of the single driving type which is realized by the DSP 16 provided for the control unit 10 in FIGS. 2A and 2B. A control system for the positioning control is constructed by a speed control unit 120 and a position servo control unit 122. First, the speed control unit 120 comprises a counter 124, a target speed generating unit 126, a speed calculating unit 128, an adder 130, a gain arithmetic operating unit 132, an analog switch 134, an adder 136, a gain arithmetic operating unit 138, an adder 140, an eccentricity memory 142, an analog switch 143, and a D/A converter 144. On the other hand, the position servo control unit 122 comprises an A/D converter 145, a TES correcting unit (position signal correcting unit) 146, an FB arithmetic operating unit 154, and a servo switch 158. A switching circuit 148, a first correcting unit 150, and a second correcting unit 152 are provided in the TES correcting unit 146.

At the time of the seeking operation, the analog switch 134 provided for the speed control unit 120 is turned on, thereby validating the speed control. The servo switch 158 provided for the position servo control unit 122 is turned off, thereby cancelling the position servo control. The analog switch 143 of the eccentricity memory 142 is also turned off and an eccentricity correction is not performed. The speed control by the speed control unit 120 is performed by the following method. That is, a target speed according to the number of remaining tracks in a range from the track where the laser beam is located at present to the target track is generated from the target speed generating unit 126 to the addition point 130. A speed difference between the target speed and the beam speed derived from the speed calculating unit 128 at that time is obtained. Predetermined gains are multiplied to the speed difference by the gain arithmetic operating units 132 and 138, a resultant output signal of the unit 138 is converted into an analog signal by the D/A converter 144. After that, a drive current is supplied to the VCM 54 through the driver, thereby performing the speed control. The target speed generating unit 126 generates the speed pattern according to the number of remaining tracks to the target track, thereby performing the speed control in which the speed is switched to the acceleration, constant speed, and deceleration. When the laser beam approaches a position near the target track center during the deceleration by the speed control unit 120, the analog switch 134 which is in the ON state so far is turned off and the servo switch 158 which is in the OFF state so far is turned on, thereby disconnecting the speed control. The control is switched to the position control by the position servo control unit 122, thereby performing the lead-in control to lead the laser beam to the center of the target track. In the lead-in control by the position servo control unit 122, the A/D converter 145 supplies the TES E2 obtained at that time as a feedback signal to the FB arithmetic operating unit (feedback arithmetic operating unit) 154 through the TES correcting unit 146. The FB arithmetic operating unit 154 inputs an arithmetic operation result to the gain arithmetic operating unit 138 through the servo switch 158 and adder 136, multiplies a predetermined gain. After that, a multiplication result is transmitted through the adder 140 and is converted into an analog signal by the D/A converter 144 and a drive current is supplied to the VCM 54, thereby performing a lead-in control.

FIGS. 6A to 6F are time charts for the seek control by the speed control unit 120 and position servo control unit 122 in FIG. 5. FIG. 6A shows a beam speed. When the speed control of FIG. 6D is turned on at time t1, a VCM current is supplied as shown in FIG. 6C for the purpose of the acceleration control until the beam speed reaches the target speed at time t2. When the speed control is started at time t1, a position servo control of FIG. 6E is turned off and, at the same time, an on-track signal of FIG. 6F is also turned off. The speed control is divisionally executed at three stages of the acceleration in a time interval between t1 and t2, the constant speed in a time interval between t2 to t3, and the deceleration in a time interval between t3 and t4 with respect to the beam speed of FIG. 6A. The tracking error signal E1 which is derived in this instance becomes an almost sine wave signal of a period that is inversely proportional to the beam speed as shown in FIG. 6B. When the beam passes at time t4 just before the target track in a state of the deceleration control at time t3, the speed control of FIG. 6D is turned off (the switch 134 is turned off) and, at the same time, a position servo control is turned on (the switch 158 is turned on) as shown in FIG. 6E. The lead-in control to the center of the target track is started. When the laser beam is led to the target track at time t5, the on-track signal of FIG. 6F is turned on and the seeking operation is completed at this time point. After completion of the seeking operation, the control is shifted to the tracking control by the position servo control. In the tracking control in which the reading operation or writing operation in the on-track control state is performed, the analog switch 143 in FIG. 5 is turned on. By adding an eccentricity correction signal from the eccentricity memory 142 to the addition point 140, the tracking control such that the TES is set to zero while allowing the carriage to follow the medium eccentricity is performed. As mentioned above, an interval from the start of the seek at time t1 to the completion of the lead-in at time t5 becomes a seek control interval T1. The last control interval of the seek control interval T1 becomes a lead-in control interval T2. In the position servo control unit 122 of the invention in FIG. 5, for the purpose of the position servo control in the last lead-in control interval T2 of the seek control interval T1 and the subsequent tracking control in FIGS. 6A to 6F, the TES E2 derived by the TES detecting circuit 48 in FIGS. 2A and 2B is not used as it is in the TES correcting unit 146 but the correction TES corrected by the TES correcting unit 146 is used as a feedback signal, thereby performing the track lead-in control and the tracking control.

(Correction of the TES by a polynomial)

Figure 7:
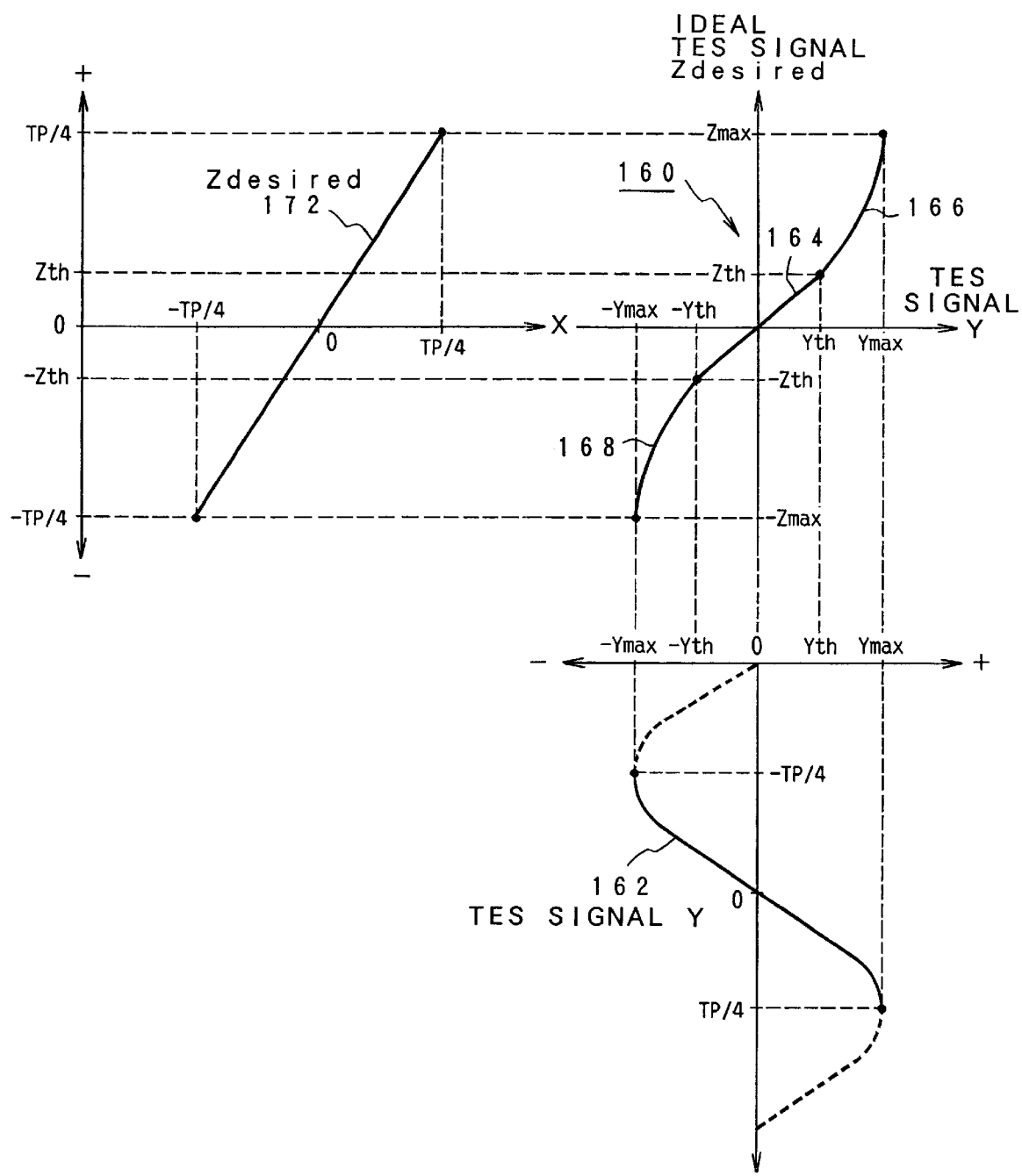
FIG. 7 is an explanatory diagram of correcting characteristics using an approximation of a quadratic polynomial by a position signal correcting unit in FIG. 5.

FIG. 7 shows the first embodiment of correcting characteristics which are set into the TES correcting unit 146 provided for the position servo control unit 122 in FIG. 5. The embodiment is characterized in that the correcting characteristics of the TES are set by an approximation by a polynomial. A way of deciding correcting characteristics 160 of the TES by a polynomial is as follows. First, with respect to the TES for the positional deviation amount X from the track center of the laser beam, a desired ideal TES $Z_{desired}$ which is intended by the designer is defined and a polynomial as a non-linear function which approximates the TES correcting characteristics 160 as much as possible is determined for the ideal TES $Z_{desired}$, thereby deciding the TES correcting characteristics 160. To decide the TES correcting characteristics 160 in FIG. 7, characteristics 162 of the TES Y for the positional deviation amount X and characteristics 172 of the ideal TES $Z_{desired}$ for the positional deviation amount X are set. In this case, the characteristics 172 of the ideal TES $Z_{desired}$ are set to $$Z_{desired}=X$$

Subsequently, with regard to the characteristics 162 of the TES Y and the characteristics 172 of the ideal TES $Z_{desired}$, values of the TES Y and the ideal TES $Z_{desired}$ in case of changing from the positional deviation amount X (TP/4) to −(TP/4) are obtained, respectively, and are plotted as TES correcting characteristics 160. The TES correcting characteristics 160 obtained as mentioned above are divided into three intervals of linear characteristics 164, non-linear characteristics 166 on the plus side of the linear characteristics 164, and non-linear characteristics 168 on the minus side of the linear characteristics 164. The linear characteristics 164 are set to a range of positive and negative predetermined threshold values $\pm Y_{th}$ around the TES Y=0 serving as a correction input as a center. That is, the linear characteristics 164 is given by $$Z=K \cdot Y \qquad (1)$$

Since K=1 in this example, $$Z=Y$$

because Y and $Z_{desired}$ are normalized.

On the other hand, the non-linear characteristics 166 in which the TES Y lies within a range between the threshold value $Y_{th}$ and a maximum amplitude $Y_{max}$ can be approximated by an Nth order polynomial. In this case, for example, they can be also approximated by the following quadratic polynomial $$Z=a_2Y^2+a_1Y+a_0 \qquad (2)$$

The non-linear characteristics 168 between a threshold value $-Y_{th}$ and a maximum amplitude $-Y_{max}$ of the TES Y can be also similarly approximated by the following quadratic polynomial.

$$Z=-(a_2Y^2+a_1|Y|+a_0) \qquad (3)$$

Figure 8:
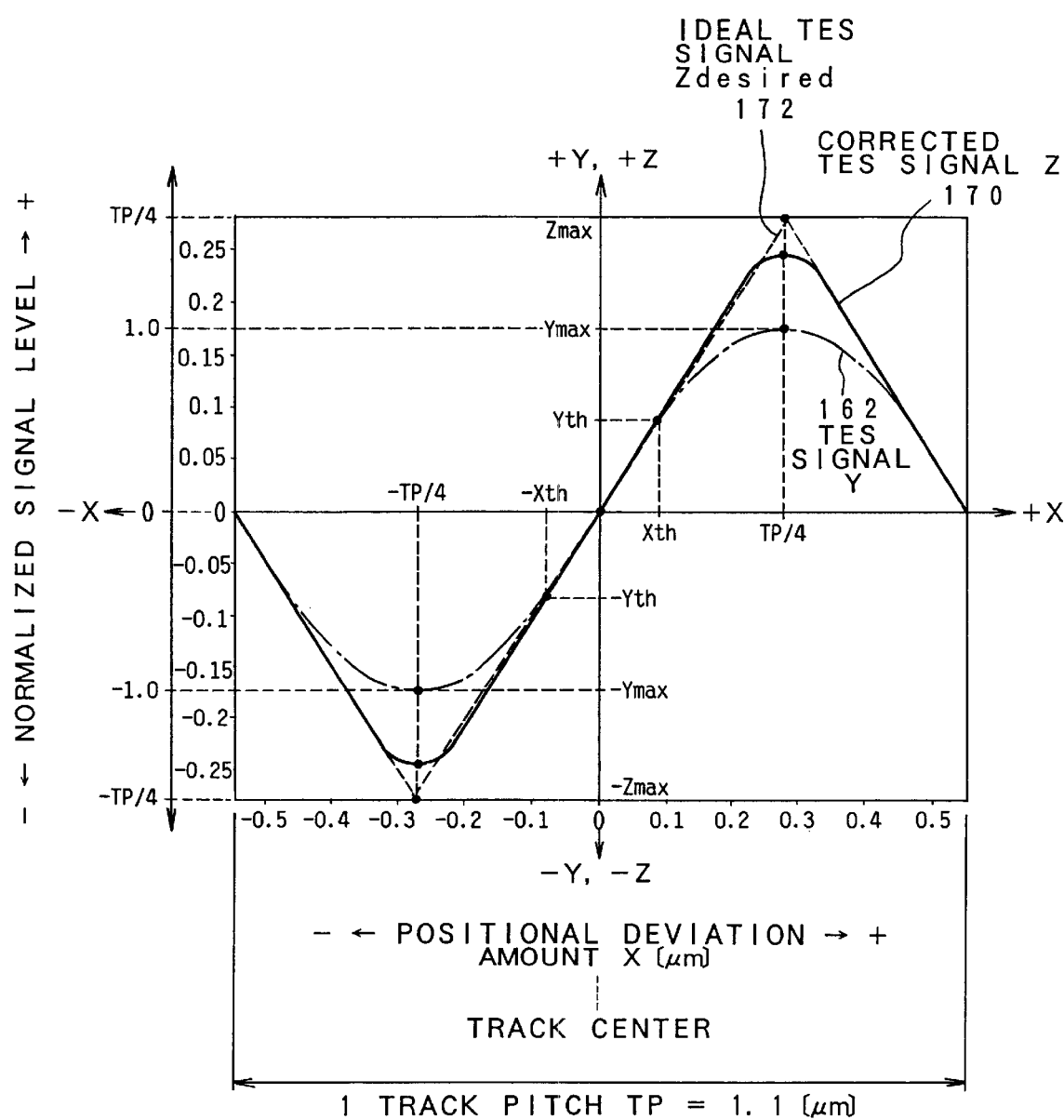
FIG. 8 is a characteristic diagram of the ideal TES $Z_{desired}$, TES Y, and a correction TES Z which are used to decide the correcting characteristics of FIG. 7.

FIG. 8 shows the ideal TES $Z_{desired}$ in FIG. 7, the TES Y as a correction input, and the corrected TES Z obtained by the TES signal correction using the non-linear characteristics approximated by the quadratic polynomials of (2) and (3) while commonly using the positional deviation amount X on the axis of abscissa. That is, the axis of abscissa indicates the positional deviation amount X in which the track center on the optical disk is set to 0 and an axis of ordinate shows the TES Y, ideal TES $Z_{desired}$, and correction TES Z as a normalized signal level. The positional deviation amount X on the axis of abscissa has a value in case of the track pitch TP=1.1 μm. For a positional change of the laser beam in a range of ±TP/2=±0.55 μm around the positional deviation amount X=0 as a center, the TES Y which is obtained by the far field method of FIGS. 4A to 4D can be approximated by a sine wave of the following equation.

$$Y = \frac{TP}{2\pi} \sin\left(\frac{2\pi}{TP} \cdot X\right) \qquad (4)$$

In the following embodiment, although explanation will be made on the assumption that the TES waveform is expressed by the equation (4), the invention is not limited to only the case where the TES waveform is expressed by a sine function like an equation (4).

From this equation (4), although the TES Y obtained by the far field method correctly shows the positional deviation amount in a predetermined range where the positional deviation amount X=0 is set to the center, in a region out of the predetermined range, the TES waveform becomes a waveform which approximates the sine waveform and does not accurately show the positional deviation amount X. Now considering the desired ideal TES $Z_{desired}$ on the assumption that the TES is derived in correspondence to the positional deviation amount X without saturation, the ideal TES $Z_{desired}$ is as shown by the linear characteristics 172. In the invention, therefore, the non-linear characteristics 162 and 168 of the TES correcting characteristics 160 in FIG. 7 are approximated by a quadratic polynomial so as to trace the characteristics 172 of the ideal TES $Z_{desired}$ as much as possible even if the TES Y of the sine waveform 162 which is actually obtained by the far field method is saturated. The characteristics 162 of the TES Y are corrected by the correcting characteristics 160 approximated by the quadratic polynomial, thereby obtaining characteristics 170 of the corrected TES Z. If a polynomial approximation accurately showing the non-linear characteristics 162 and 168 obtained by the plotting of the characteristics 172 of the ideal TES $Z_{desired}$ and the characteristics 162 of the TES Y in FIG. 7 can be performed, the characteristics 170 of the correction TES Z in FIG. 8 ought to become triangular characteristics which coincide with the characteristics 172 of the ideal TES $Z_{desired}$. However, although the characteristics 170 of the corrected TES Z slightly causes a saturation in the peak portion due to an error of the polynomial approximation, it can be said that an adequate approximating precision is obtained. Such a polynomial approximation of the invention can be shown by the following general expression. Now, assuming that the TES serving as a correction input is shown by Y and the corrected TES serving as a correction output is labelled as Z, $$Z = F_{mod}(Y) \quad (5)$$

where, $F_{mod}()$ denotes a non-linear function

It is now assumed that the non-linear function $F_{mod}()$ is practically a sectional function according to the value of the TES Y.

$$Z = F_{mod}(Y) = \begin{cases} F_{mod1}(Y), & \text{if } b < Y \leq a \\ F_{mod2}(Y), & \text{if } c < Y \leq b \\ \cdots \end{cases} \quad (6)$$

On the other hand, the characteristics of the desired ideal TES $Z_{desired}$ which is intended by the designer assume $$Z_{desired} = F_{desired}(X) \quad (7)$$

Now, the TES Y is a function of X as approximately shown by, for example, the equation (4) and $$Y = F_{TES}(X) \quad (8)$$

The characteristics corrected by the equation (5) or (6) are also eventually a function of X like the following equation.

$$Z = F_{mod}(Y) = F_{mod}\{F_{TES}(X)\} \quad (9)$$

The non-linear function $F_{mod}$ of the equation (5) is obtained so that the characteristics of the correction TES Z expressed by the equation (9) for X are approximately equivalent to the characteristics for the ideal TES $Z_{desired}$ expressed by the equation (7). The following Nth order polynomial is now used as a non-linear function $F_{mod}()$ in the first embodiment of FIG. 9.

$$Z = F_{mod}(Y) = a_N Y^N + a_{N-1} Y^{N-1} + \cdots + a_2 Y^2 + a_1 Y + a_0 \quad (10)$$

With respect to the Nth order polynomial of the equation (10), in case of using the sectional function like an equation (6), each sectional function becomes the following Nth order polynomial.

$$F_{mod\,①}(Y) = a_N^{①} Y^N + a_{N-1}^{①} Y^{N-1} + \cdots + a_2^{①} Y^2 + a_1^{①} Y + a_0^{①} \quad (11)$$

$$F_{mod\,②}(Y) = a_N^{②} Y^N + a_{N-1}^{②} Y^{N-1} + \cdots + a_2^{②} Y^2 + a_1^{②} Y + a_0^{②}$$

On the basis of the TES correcting principle using the Nth order polynomial of the invention, the quadratic polynomial is defined as follows in the cases of FIGS. 7 and 8. With respect to a region where the signal amplitude of the TES Y serving as a sine waveform 162 in FIG. 8 exceeds predetermined threshold values $Y_{th}$ and $-Y_{th}$, by correcting by the Nth order polynomial, specifically speaking, the quadratic polynomial, an enough feedback amount of the lead-in control can be obtained. That is, the TES Y approximated by the sine waveform 162 is approximated to the ideal TES $Z_{desired}$ of the linear characteristics 172 in a certain range where the positional deviation amount X=0 is set to the center. However, in a region out of this range, the TES Y is saturated, the sensitivity deteriorates, and the feedback amount decreases, so that there is a fear such that the lead-in control fails. In FIG. 8, when the TES Y whose amplitude is equal to the maximum amplitude $\pm Y_{max}$ at the position of the positional deviation amount $X=\pm TP/4$ exceeds 50% of the maximum amplitude $\pm Y_{max}$, the sensitivity to the ideal TES $Z_{desired}$ of the straight line 172 deteriorates. In the embodiment, therefore, the characteristics in a range of the threshold values $\pm Y_{th} = \pm 0.5 Y_{max}$ are converted by the linear characteristics. The characteristics in a non-linear range exceeding the threshold values $\pm Y_{th} = \pm 0.5 Y_{max}$ are corrected by the approximation by the quadratic polynomial. That is, the TES correcting characteristics 160 in FIG. 7 obtained by the plotting based on the characteristics 172 of the ideal TES $Z_{desired}$ which is intended by the designer and the characteristics 162 of the TES Y are approximated by the following equation.

$$Z = F_{mod}(Y) = \begin{cases} Y, & |Y| \leq Y_{th} \\ a_2 Y^2 + a_1 Y + a_0, & Y_{th} < Y \leq Y_{max} \\ -(a_2 Y^2 + a_1 |Y| + a_0), & -Y_{max} \leq Y < -Y_{th} \end{cases} \quad (12)$$

where, $Y_{th} = Y_{max} \cdot K_{th} \geq 0$, $0 \leq K_{th} \leq 1$

When the sectional functions of the equation (12) are now specifically examined with respect to FIG. 8, by substituting TP=1.1 $\mu$m for the amplitude (TP/2$\pi$) in the equation (4), the maximum amplitude $Y_{max}$ in the characteristics 162 of the TES Y having the sine waveform is equal to $Y_{max}$ =0.175 $\mu$m. The maximum amplitude $-Y_{max}$ is also similarly equal to $-Y_{max}$ =−0.175 $\mu$m. As for the characteristics of the TES Y having the sine waveform, since the separation from the linear characteristics 172 of the ideal TES $Z_{desired}$ is large in a range larger than 50% of the amplitude, the threshold value $Y_{th}$ is decided as $K_{th} = 0.5$. In the range of $\pm Y_{th}$, the characteristics 162 of the TES Y are regarded such that they are preferably approximated to the linear characteristics 172 of the ideal TES $Z_{desired}$ and are set to the corrected TES Z as it is. The coefficients $a_0$, $a_1$, and $a_2$ in the quadratic polynomial in the equation (12) are determined by a curve fitting method based on the method of least squares with respect to the non-linear characteristics 162 and 168 in the correcting characteristics 160 derived in FIG. 7 so that they become the quadratic polynomial which approximates them. The details will be clearly explained herein later. According to the present inventors, as coefficients $a_0$, $a_1$, and $a_2$ of the quadratic polynomial which approximates the non-linear characteristics 166 and 168 in FIG. 7, the following values can be determined.

$$a_0 = 1.454 \times 10^{-7}$$

$$a_1 = -1.686$$

$$a_2 = 1.293 \times 10^7$$

The equation (12) in which such coefficients $a_0$, $a_1$, and $a_2$ are decided is set as a correction arithmetic operating function into the TES correcting unit 146 in FIG. 5. In the TES correcting unit 146 in FIG. 5, the switching circuit 148 selects an output of the A/D converter 145, first correcting unit 150, or second correcting unit 152 in accordance with the sectional functions in the equation (12). That is, the threshold values $\pm Y_{th} = \pm 0.5 Y_{max}$ derived from FIG. 8 are set in the switching circuit 148. If the TES Y converted to the digital data by the A/D converter 145 lies within the range of the threshold values $\pm Y_{th}$, the switching circuit 148 selects the output of the A/D converter 145 as it is and outputs as a feedback signal to the FB arithmetic operating unit 154. On the contrary, when the TES Y exceeds the threshold value $Y_{th}$, the switching circuit 148 selects the first correcting unit 150.

$$Z = a_2 Y^2 + a_1 Y + a_0$$

in the equation (12) has been set in the first correcting unit 150. The inputted TES Y is corrected in accordance with the quadratic polynomial which approximates the non-linear characteristics 166 in FIG. 7. The correction TES Z is outputted as a feedback signal to the FB arithmetic operating unit 154 through the switching circuit 148. When the TES Y from the A/D converter 145 is lower than the threshold value $-Y_{th}$, the switching circuit 148 selects the second correcting unit 152. A correcting equation $$Z = -(a_2 Y^2 + a_1 |Y| + a_0)$$

in the equation (12) has been set in the second correcting unit 152. The second correcting unit 152 corrects the inputted TES Y in accordance with the quadratic polynomial which approximates the non-linear characteristics 168 in FIG. 7. The correction TES Z is outputted as a feedback signal to the FB arithmetic operating unit 154 through the switching circuit 148.

Figure 9:
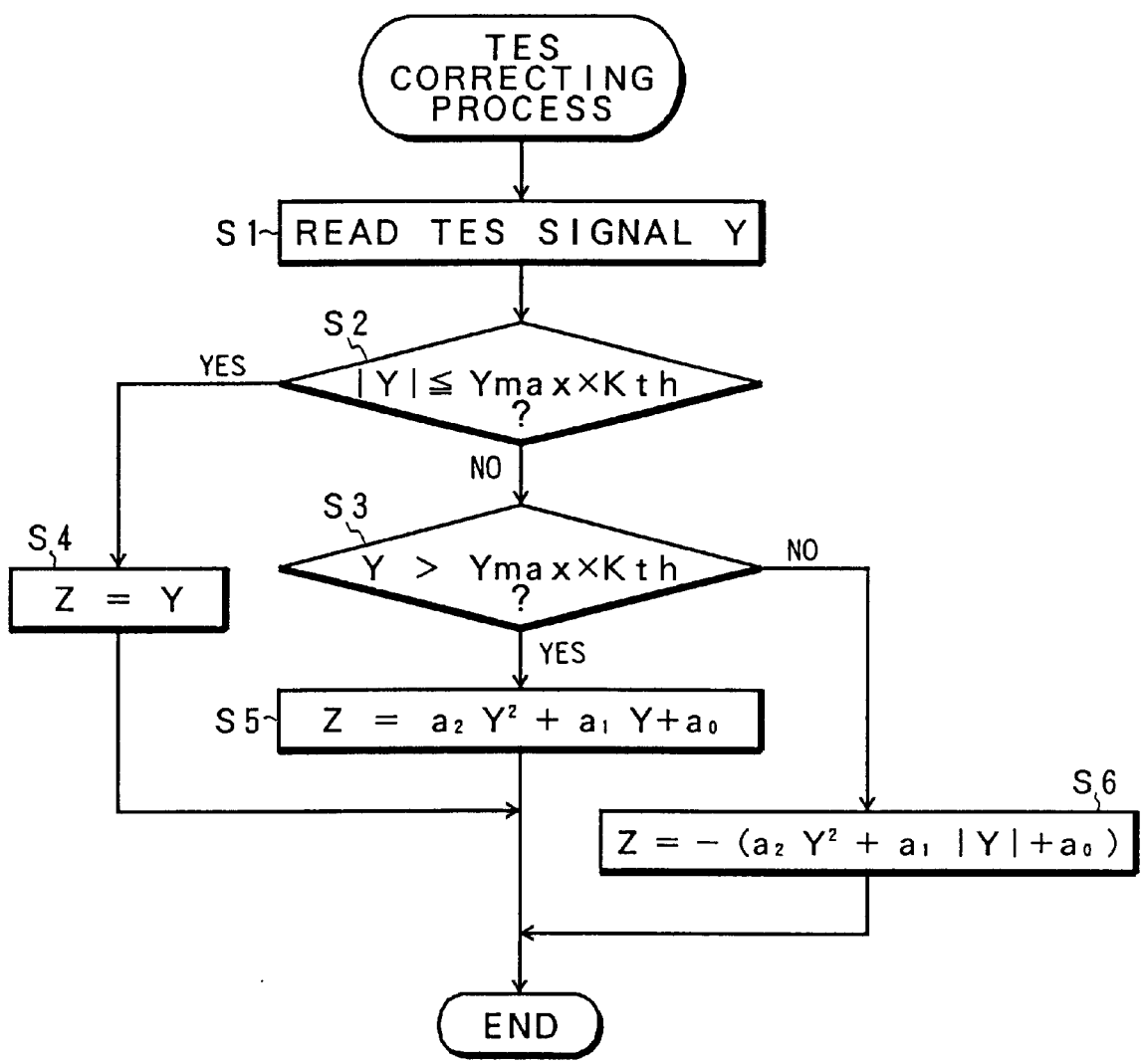
FIG. 9 is a flowchart for a correcting process using the quadratic polynomial by the position signal correcting unit in FIG. 5.

FIG. 9 is a flowchart for the correcting process by the TES correcting unit 146 in FIG. 5. First in step S1, the TES Y derived from the A/D converter 145 is read. In step S2, the absolute value |Y| is compared with the threshold value $Y_{th} = Y_{max} \times K_{th}$. When the absolute value |Y| lies within a range of the threshold value ($Y_{max} \times K_{th}$), step S4 follows and the TES Y is outputted as it is as a correction TES Z. In step S2, when the absolute value |Y| is out of the range of the threshold value ($Y_{max} \times K_{th}$), a check is made in step S3 to see if the TES Y exceeds the threshold value ($Y_{max} \times K_{th}$). If YES, in step S5, the correction according to the quadratic polynomial on the plus side is performed and the correction TES Z is outputted. In step S3, when the TES Y is equal to or less than the threshold value ($Y_{max} \times K_{th}$), step S6 follows and the correction TES Z corrected by the quadratic monomial equation on the minus side is outputted.

Figure 10:
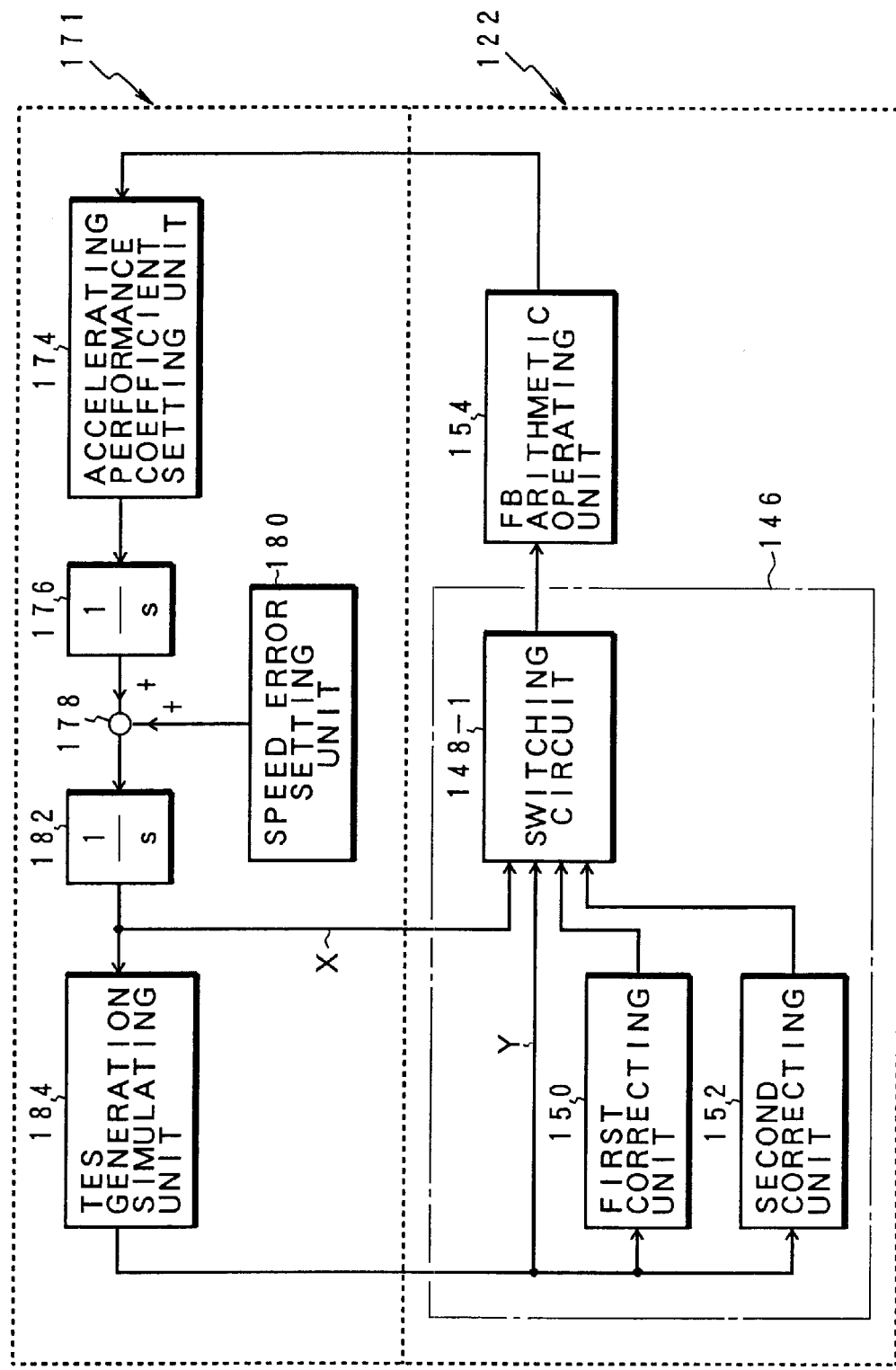
FIG. 10 is a block diagram of a simulator for confirming the lead-in performance by the positioning control unit in FIG. 5.

FIG. 10 is a functional block diagram of a simulator to evaluate the track lead-in control by the position servo control unit 122 having the function of the TES correcting unit 146 in FIG. 7. The position control unit 122 is fundamentally the same as that in the embodiment of FIG. 5 and has the TES correcting unit 146 and FB arithmetic operating unit 154. A pseudo carriage 171 is provided for the position control unit 122. The carriage 171 simulates the pickup mechanism of the single driving type and has an accelerating performance coefficient setting unit 174 and transfer functions 176 and 182. An addition point 178 is provided between the transfer functions 176 and 182. The carriage 171 has a speed error setting unit 180 for introducing an initial speed of the lead-in control as a disturbance. The accelerating performance coefficient setting unit 174 sets an acceleration coefficient $K_\alpha = BL/M$ [m/sec$^2$/A] in which there is a relation of $$\alpha = (BL/M) \cdot i$$

where, M: mass of the carriage
BL: magnetic flux density of the VCM
i: current
$\alpha$: acceleration For example, $K_\alpha = 105$ [m/sec$^2$/A]. Upon simulation, the FB arithmetic operating unit 154 performs only a P arithmetic operation and uses, for example, $K_p = -7 \times 10^5$ as a proportional coefficient $K_p$. A TES generation simulating unit 184 is provided for the carriage 171 and the TES Y is falsely generated. In this simulator, the position error signal X which is inputted to the TES generation simulating unit 184 is supplied to a switching circuit 148-1 of the TES correcting unit 146 for the purpose of verification. Although the position error signal X cannot be obtained in the actual apparatus, in order to evaluate the lead-in control by the TES correction of the invention, the position error signal X is inputted as a feedback signal to the switching circuit 148-1 so as to enable the lead-in control.

Figure 11A:
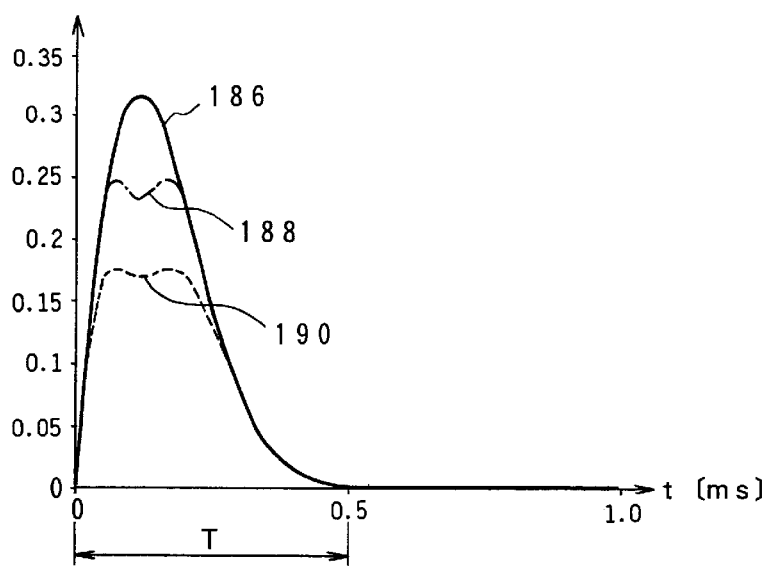
FIGS. 11A to 11C are time charts when a feedback signal is switched to a position error signal X, the TES Y, and the correction TES Z by the simulator in FIG. 10 and a lead-in control is performed.
Figure 11B:
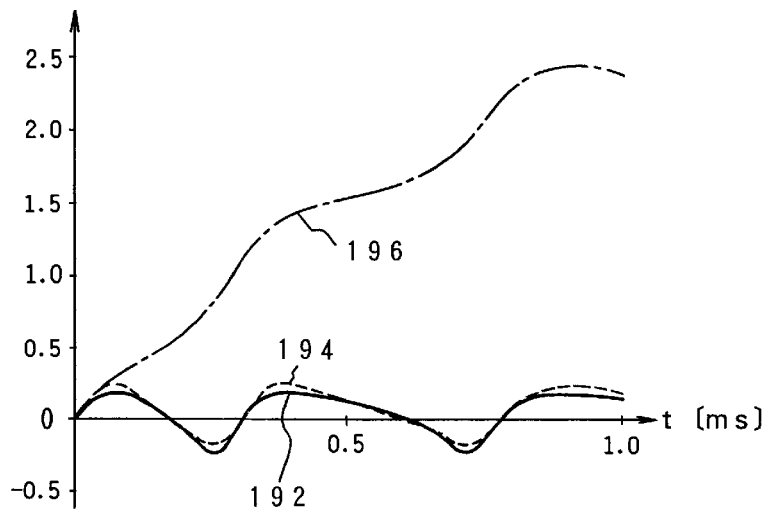
Figure 11C:
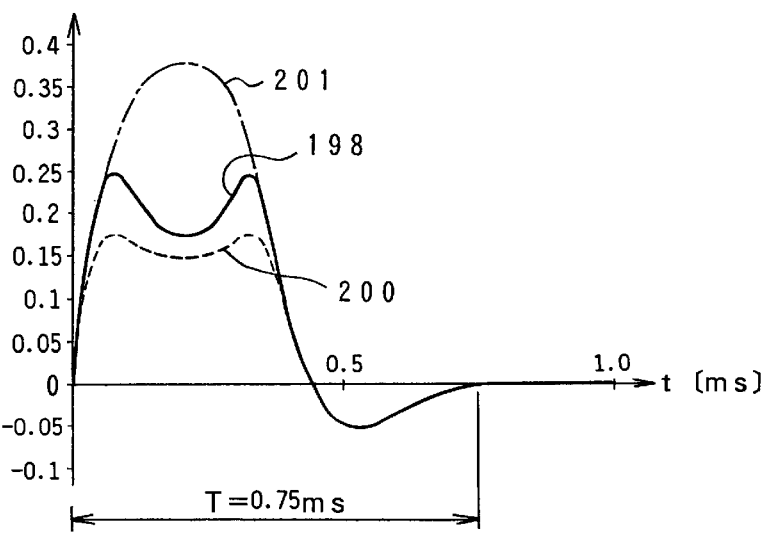

FIGS. 11A to 11C are time charts in the case where the quadratic polynomial in the equation (12) having the coefficients $$a_0 = 1.454 \times 10^{-7}$$

$$a_1 = -1.686$$

$$a_2 = 1.293 \times 10^7$$

determined by the present inventors is set into the TES correcting unit 146, the feedback signal which is inputted to the FB arithmetic operating unit 154 is switched to the position error signal X, TES Y, and correction TES Z by the switching circuit 148-1, 5 [mm/sec] is set as an initial speed error at the time of the start of the lead-in control by the speed error setting unit 180 of the carriage 171 in each signal, and the lead-in control is executed. FIG. 11A shows the case where the position error signal X from the carriage 171 is always selected by the switching circuit 148-1 in FIG.

10 and is fed back. The lead-in control by the position error signal X is as shown characteristics 186 and becomes an ideal,control such that the laser beam is led to the track center in a lead-in time T=0.5 μsec without causing a hunting. Actually, the position error signal X is not obtained and it is a virtual simulation. In FIG. 11A, a waveform 188 of the correction TES Z and a waveform 190 of the TES Y which are calculated in association with the feedback of the waveform 186 of the position error signal X are also shown. FIG. 11B is the time chart for the lead-in control in the case where the TES Y from the TES generation simulating unit 184 is always selected by the switching circuit 148-1 in FIG. 10 and is inputted as a feedback signal to the FB arithmetic operating unit 154. In this case, like a waveform 192 of the TES Y, since a feedback amount is insufficient, the laser beam cannot be led to the track center of the target track. The pickup enters a runaway state in which the laser beam moves over the target track. The correction TES Z which is calculated in this case is as shown by a waveform 194. The position error signal X showing the actual beam position is as shown by a waveform 196. FIG. 11C shows the case where the switching function for the TES correction shown by the flowchart of FIG. 9 is validated with respect to the switching circuit 148-1 in FIG. 10. In this case, a waveform 198 of the correction TES Z is inputted as a feedback signal to the FB arithmetic operating unit 154. The waveform 198 of the correction TES Z is sufficiently larger than a waveform 200 of the TES Y before correction, so that an enough feedback amount is derived at the time of the lead-in control. Thus, after the laser beam was led to the track center of the target track, the waveform 198 of the correction TES Z slightly overshoots to the minus side and is subsequently converged. A convergence time in this case is equal to T=about 0.75 msec. According to the track lead-in control in which the correction TES Z is fed back in FIG. 11C, although the lead-in is successful, the convergence time is equal to T=about 0.75 msec and is longer than the convergence time T=0.5 msec in case of feeding back the position error signal X in FIG. 11A. In the second embodiment of the invention, therefore, as shown in FIG. 12, the ideal TES $Z_{desired}$ which is used for decision of the quadratic polynomial that is used for correction is not set to the linear characteristics 172 as shown in FIG. 8 but is set to characteristics 204 of the ideal TES $Z_{desired}$ which is defined by the following function in which the correcting sensitivity of the position error is higher.

Figure 12:
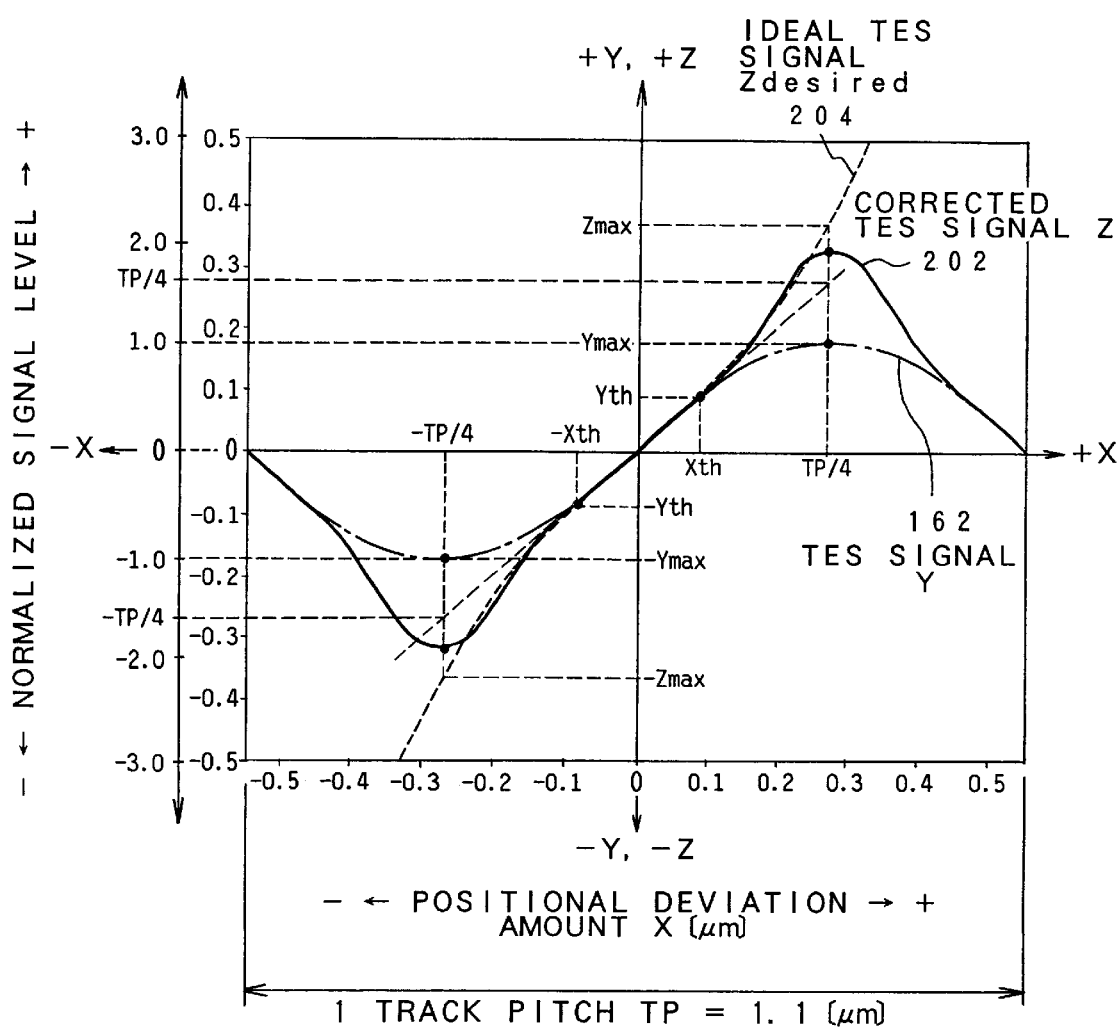
FIG. 12 is a characteristic diagram showing other ideal TES $Z_{desired}$ and correction TES Z, together with the TES Y, which are used to decide the correcting characteristics using a quadratic polynomial.

FIG. 13 representatively shows the non-linear ideal TES $Z_{desired}$ 204 in FIG. 12. The non-linear characteristics 204 are defined by the sectional functions by the following equation.

$$Z_{desired} = \begin{cases} X, & \text{if } |X| \leq X_{th} \\ X + K_{NL}(X - X_{th})^n, & \text{if } X_{th} < X \\ -\{|X| + K_{NL}(|X| - X_{th})^n\}, & \text{if } X < -X_{th} \end{cases} \quad (13)$$

where, $K_{NL}$: arbitrary sensitivity emphasis coefficient

In a region where the positional deviation amount X lies within a range of the threshold values $\pm X_{th}$, the non-linear ideal TES $Z_{desired}$ shows the same characteristics as the linear characteristics 172 of the ideal TES $Z_{desired}$ in FIG. 7 in accordance with linear characteristics 205. However, in a range exceeding the threshold values $\pm X_{th}$, the signal is set to a further emphasized signal having a high sensitivity for the positional deviation amount X by non-linear characteristics 206 and 208, thereby intending to obtain an enough large feedback amount for the lead-in control.

In the embodiment, as shown in FIGS. 1, 7, 8, 12, 13, etc., the TES Y, ideal position signal $Z_{desired}$, and the like have been normalized to the amounts of the position dimension and the explanation has been made. Therefore, in the equation (13), a proportional conversion coefficient of the position X and the ideal position signal $Z_{desired}$ is equal to 1 ($K_{XZ}$=1 in the equation (13')). However, it is generally expressed by the following equation.

$$Z_{desired} = \begin{cases} K_{XZ} \cdot X, & \text{if } |X| \leq X_{th} \\ K_{XZ} \cdot X + K_{NL}(X - X_{th})^n, & \text{if } X_{th} < X \\ -\{K_{XZ} \cdot |X| + K_{NL}(|X| - X_{th})^n\}, & \text{if } X < -X_{th} \end{cases} \quad (13')$$

where, $K_{XZ}$: arbitrary proportional conversion coefficient

Figure 14:
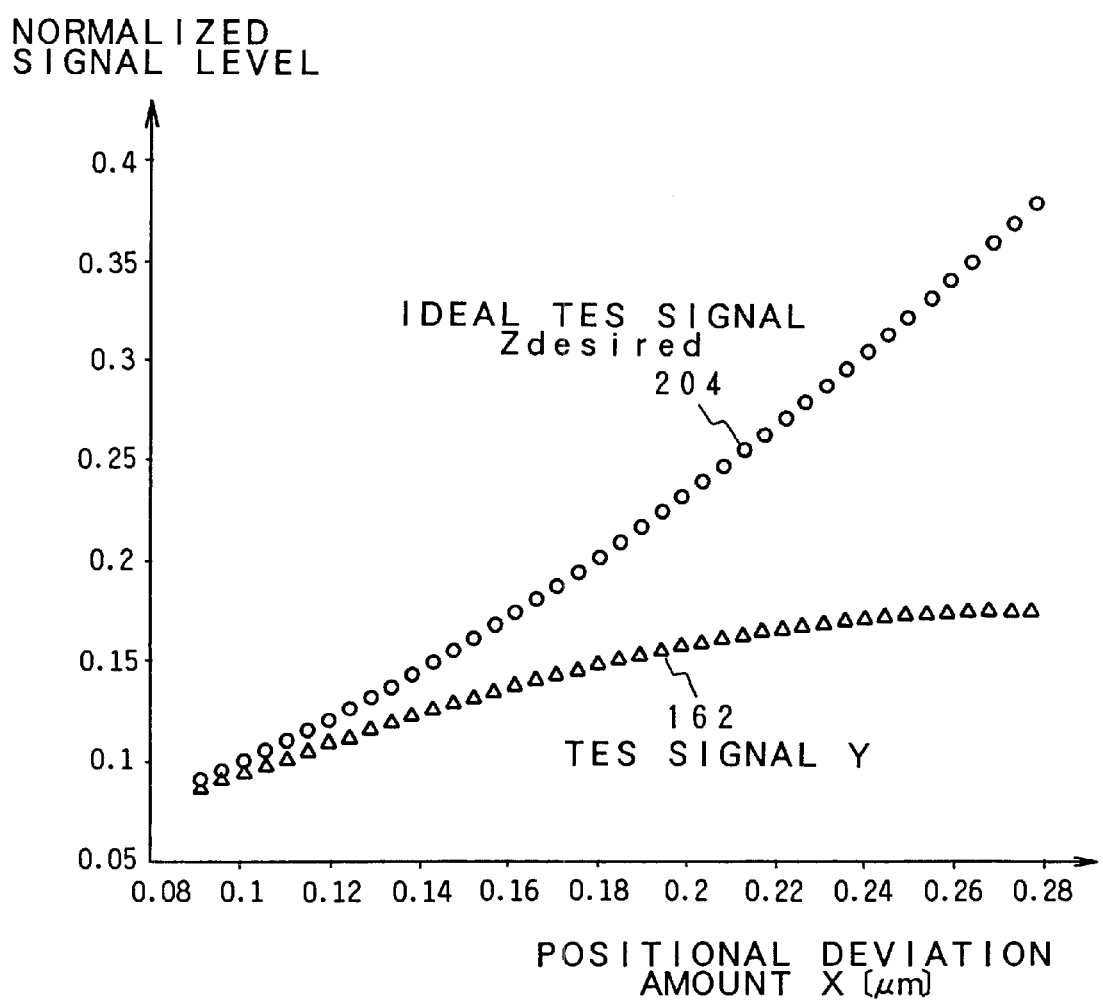
FIG. 14 is a characteristic diagram in which the TES Y and ideal TES $Z_{desired}$ in FIG. 12 are enlargedly plotted.
Figure 15:
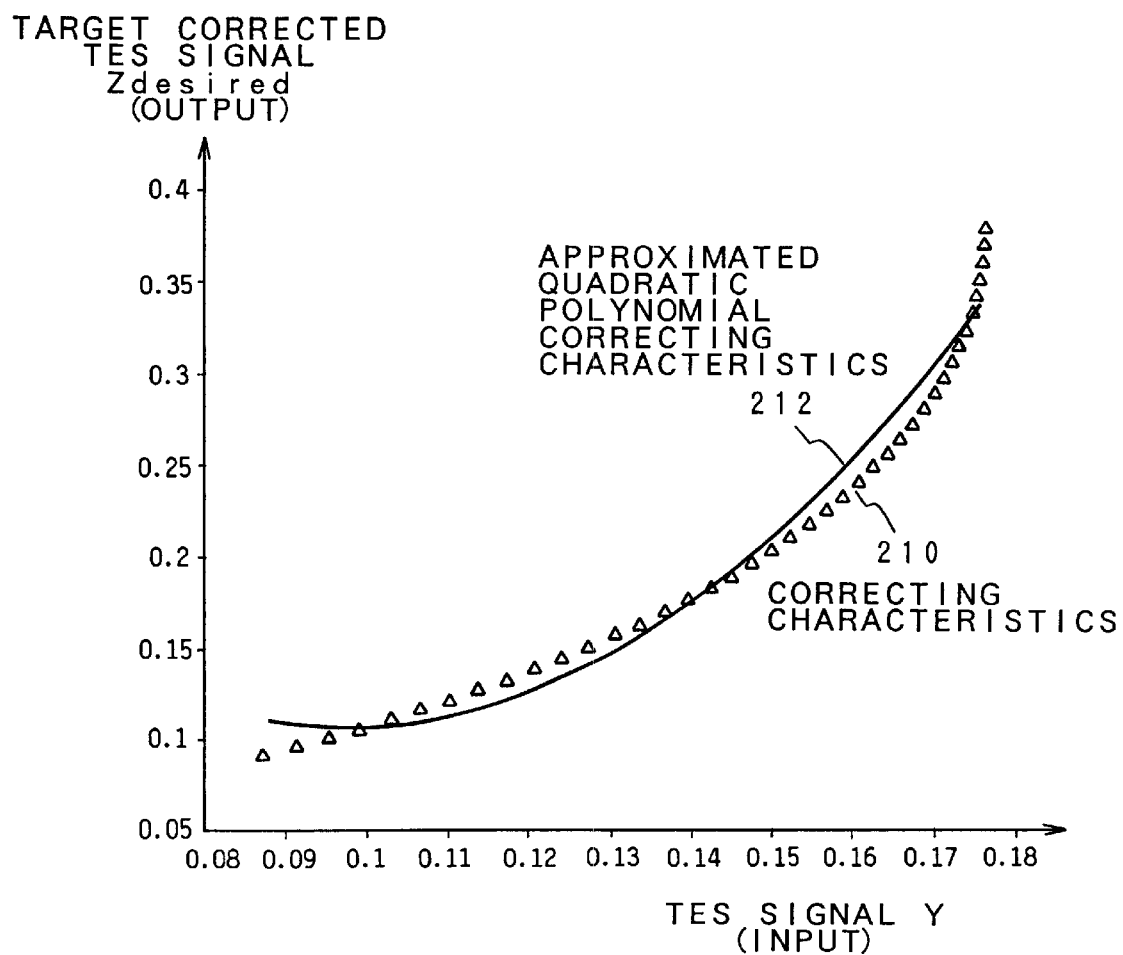
FIG. 15 is a characteristic diagram of correcting characteristics obtained by plotting the TES Y in FIG. 14 onto an axis of abscissa and by plotting the ideal TES $Z_{desired}$ onto an axis of ordinate and correcting characteristics by a quadratic polynomial obtained by approximating such correcting characteristics.

When the characteristics 204 of the non-linear ideal TES $Z_{desired}$ shown in FIG. 13 are set, the coefficients $a_0$, $a_1$ and $a_2$ of the equation (12) to approximate the waveform 162 of the TES Y serving as a correction input to the waveform 204 of the ideal TES $Z_{desired}$ are determined. The coefficients $a_0$, $a_1$ and $a_2$ of the quadratic polynomial which approximates the non-linear portion of the correcting characteristics based on the characteristics 204 of the ideal TES $Z_{desired}$ in FIG. 13 are determined as follows with respect to the characteristics 162 of the TES Y in FIG. 14 shown as for the change in positional deviation amount X exceeding the threshold value $X_{th}$ in the first quadrant and the characteristics 204 of the ideal TES $Z_{desired}$ as examples. First with respect to FIG. 14, values (Δ marks) of the characteristics 162 of the TES Y and values (○ marks) of the characteristics 204 of the TES $Z_{desired}$ at every predetermined pitch intervals of the positional deviation amount X are obtained, respectively. By plotting those values like Δ marks onto an axis of abscissa and an axis of ordinate of FIG. 15, TES correcting characteristics 210 of the non-linear portion are obtained. With respect to the correcting characteristics 210 of the plotted Δ marks, the coefficients $a_0$, $a_1$, and $a_2$ are obtained by a curve fitting by the method of least squares so as to become quadratic polynomial correcting characteristics 212 which most approximate the correcting characteristics 210. Specifically speaking, as a threshold value $X_{th}$ in the equation (13), namely, as a threshold value $X_{th}$ corresponding to the threshold value $Y_{th}$ that is equal to 50% of the maximum amplitude $Y_{max}$ of the sine waveform 162 of the TES Y in FIG. 12, by substituting TP=1.1 μm and Y=0.0875 into the equation (4), $X_{th}$=0.0917 μm is obtained. Therefore, there is considered a method of correcting the TES Y to the ideal TES $Z_{desired}$ in a range of the position X=0.275 μm, namely, 0.0917 μm ≦X≦0.275 μm corresponding to the maximum amplitude $Y_{max}$ as $X_{th}$=0.0917 μm in the equation (13).

The characteristics 204 of the ideal TES $Z_{desired}$ plotted in FIG. 14 relate to the case where the sensitivity emphasis coefficients $K_{NL}$=3×10$^6$ and n =2 in the equation (13). On the basis of the characteristics 204 of the ideal TES $Z_{desired}$ and the characteristics 162 of the TES Y, with respect to the correcting characteristics 210 plotted like Δ marks in FIG. 15, the quadratic polynomial correcting characteristics 212 are obtained by the curve fitting by the method of least squares. The coefficients in this case are determined as $a_0$=3.256×10$^{-7}$ $a_1$=−5.059

$a_2$=−2.872×10$^7$

Figure 16:
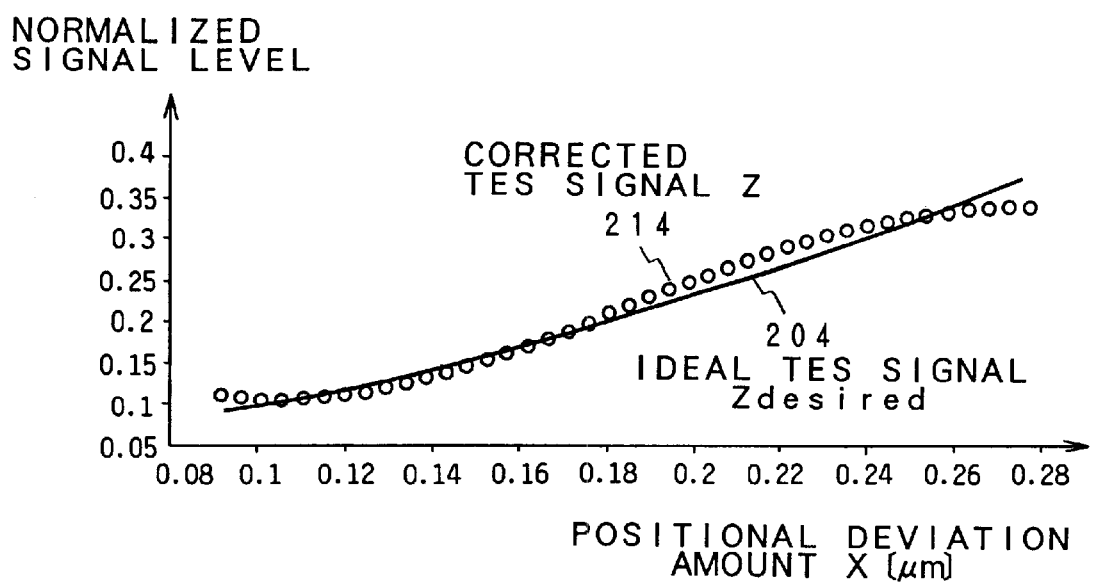
FIG. 16 is a characteristic diagram showing an approximation degree of the correction TES Z corrected by a quadratic polynomial having coefficients $a_2$, $a_1$, and $a_0$ obtained from FIG. 15 and the ideal TES $Z_{desired}$ in FIG. 12.

In FIG. 16, the characteristics 214 of the correction TES Z calculated by substituting the TES Y at every predetermined pitch intervals into the equation (13) in which the coefficients $a_0$, $a_1$, and $a_2$ obtained as mentioned above have been set are plotted like ○ marks, the characteristics 204 of the ideal TES $Z_{desired}$ in FIG. 14 are overlaid on the characteristics 214, and an approximation degree between both of the characteristics is shown.

Figure 17:
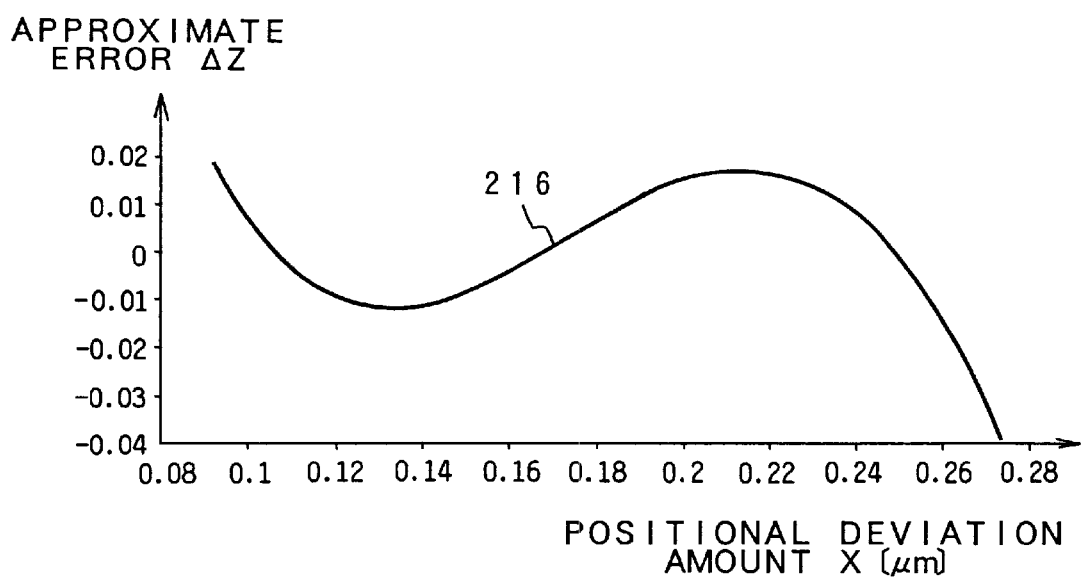
FIG. 17 is a characteristic diagram of an approximation error between the correction TES Z and ideal TES $Z_{desired}$ in FIG. 16.

FIG. 17 shows characteristics 216 of an approximation error ΔZ between the characteristics 214 of the correction TES Z in FIG. 16 and the characteristics 204 of the ideal TES $Z_{desired}$. In most of the portions, the errors between them lie within a range of ΔZ=±0.02 μm. Even in the worst case, ΔZ=0.04 μm and, practically, the characteristics 210 of the ideal TES $Z_{desired}$ can be approximated at an enough precision by the characteristics 214 of the correction TES Z by the quadratic monomial equation.

Figure 18:
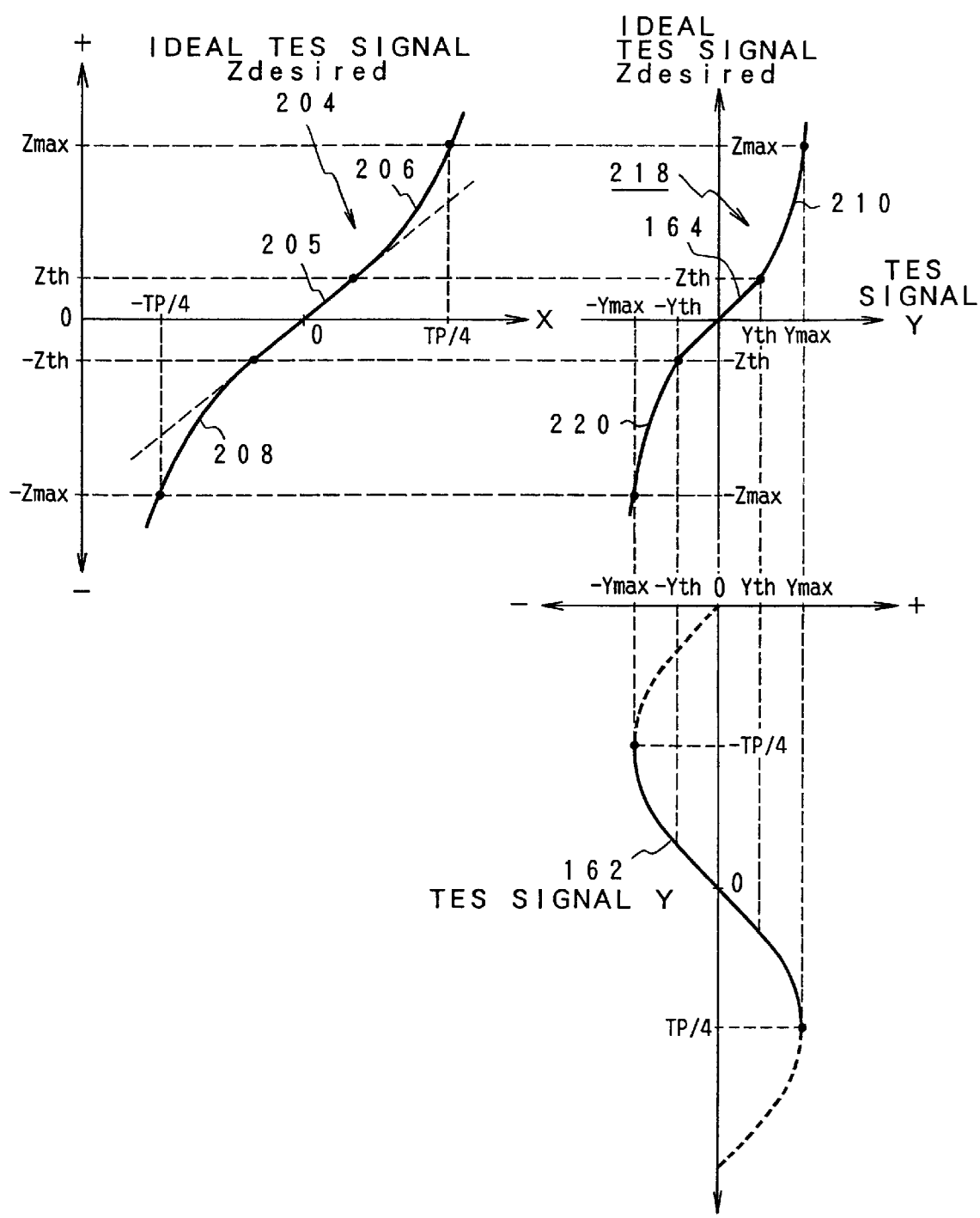
FIG. 18 is an explanatory diagram of correcting characteristics obtained on the basis of the ideal TES $Z_{desired}$ and TES Y in FIG. 12.

FIG. 18 shows whole correcting characteristics 218 plotted on the basis of the characteristics 204 of the ideal TES $Z_{desired}$ in FIG. 12 and the characteristics 162 of the TES Y. In the correcting characteristics 218, the center shows the linear characteristics 164 and the non-linear characteristics 210 on the plus side on the outside show the quadratic polynomial correcting characteristics 212 in FIG. 15 and are approximated by $$Z = a_2 Y^2 + a_1 Y + a_0$$

obtained from the equation (10). On the other hand, with respect to non-linear characteristics 220 on the minus side are approximated by $$Z = -(a_2 Y^2 + a_1 |Y| + a_0)$$

obtained from the equation (11) as a quadratic polynomial to which a minus sign is added.

Figure 19:
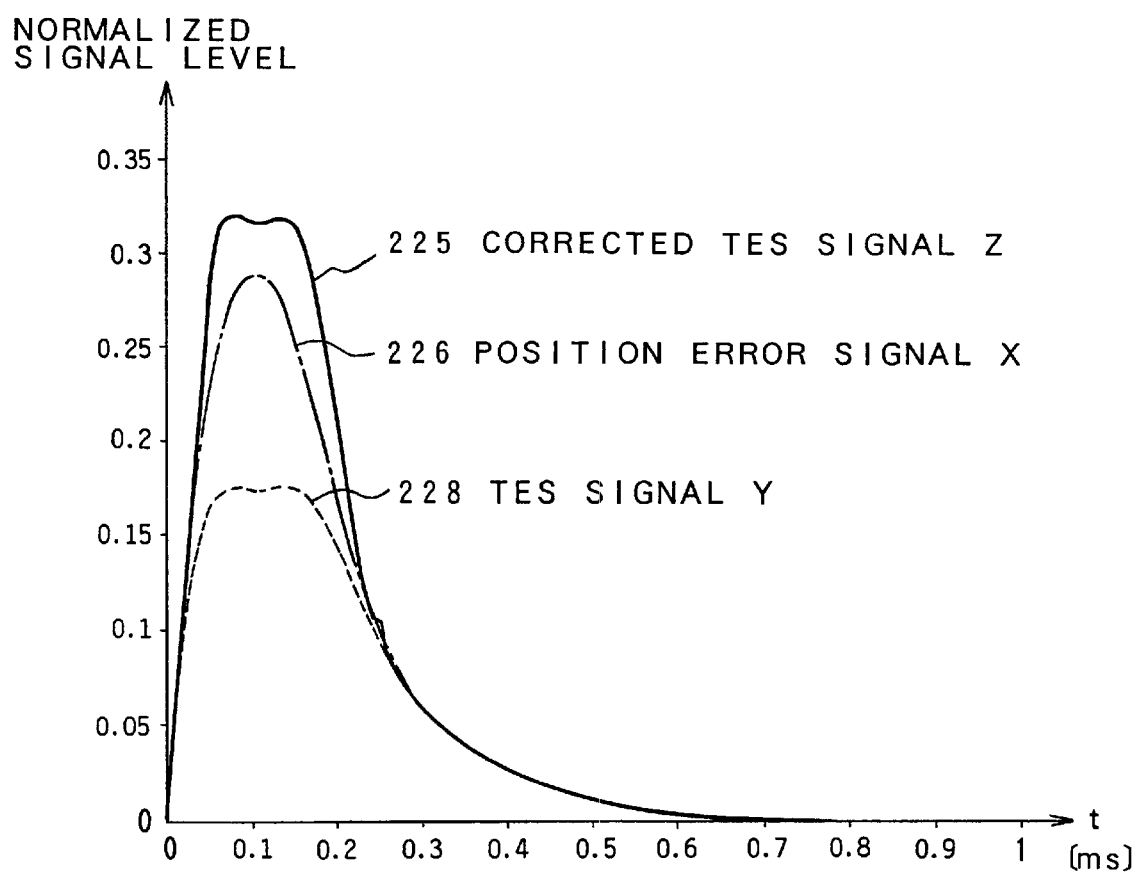
FIG. 19 is a time chart for a lead-in control in which the correction TES Z obtained by a quadratic polynomial for approximating the correcting characteristics in FIG. 18 is fed back by the simulator in FIG. 10.

FIG. 19 is a time chart for the lead-in control in the case where the quadratic polynomial of the equation (13) having the coefficients $a_0$, $a_1$, and $a_2$ decided on the basis of FIG. 12 is set into the TES correcting unit 146 of the simulator of FIG. 7, the TES Y is corrected in accordance with the flowchart of FIG. 9 by the switching circuit 148, and the correction TES Z is inputted as a feedback signal to the FB arithmetic operating unit 154. In this case, an enough amplitude emphasis exceeding a signal waveform 226 of the position error signal X is performed to a signal waveform 225 of the correction TES Z which is inputted as a feedback signal, so that the lead-in convergence time T to the target track center can be reduced to about 0.6 μsec as compared with 0.75 μsec in case of FIG. 11C. The laser beam can be smoothly led to the track center without causing an undershoot which occurred in the lead-in control of FIG. 11C. The convergence time can be sufficiently reduced. In the correction of the TES using the Nth order polynomial, the linear characteristics 172 are used in case of FIG. 8 and the non-linear characteristics 204 which are given by the equation (13) in case of FIG. 12 are used as an ideal TES $Z_{desired}$ and a quadratic polynomial which approximates them is obtained, thereby correcting the TES Y. However, the invention is not limited to this method but it is also possible to decide another ideal TES $Z_{desired}$ as a design target, to decide an Nth order polynomial which approximates it, and to correct. The interval of the TES is divided into three intervals and each interval is approximated by the Nth order polynomial. However, to further raise the approximating precision, by increasing the dividing number and allocating a peculiar Nth order monomial equation to each range, the approximating precision can be further raised. In this case, it is sufficient to select the number of dividing ranges by a trade-off such as required precision, processing speed, or the like of the approximation. If the approximation requested precision can be satisfied, the whole range can be also approximated by a single Nth order polynomial. Further, with respect to the degree N of the Nth order polynomial as well, although the approximating precision becomes higher as the degree N is higher, since the calculating time for correction increases, it is sufficient to also decide the optimum value of the degree N by the trade-off with respect to such a point. Moreover, in the TES correcting process of the invention, the function approximation is performed by the Nth order polynomial without using a function such as cosine, sine, EXP, or the like. Therefore, even in an optical disk drive in which a position control system is constructed by a DSP or the like of a fixed point which doesn't have a function library of them, the TES correcting function according to the invention can be easily installed.

Figure 20:
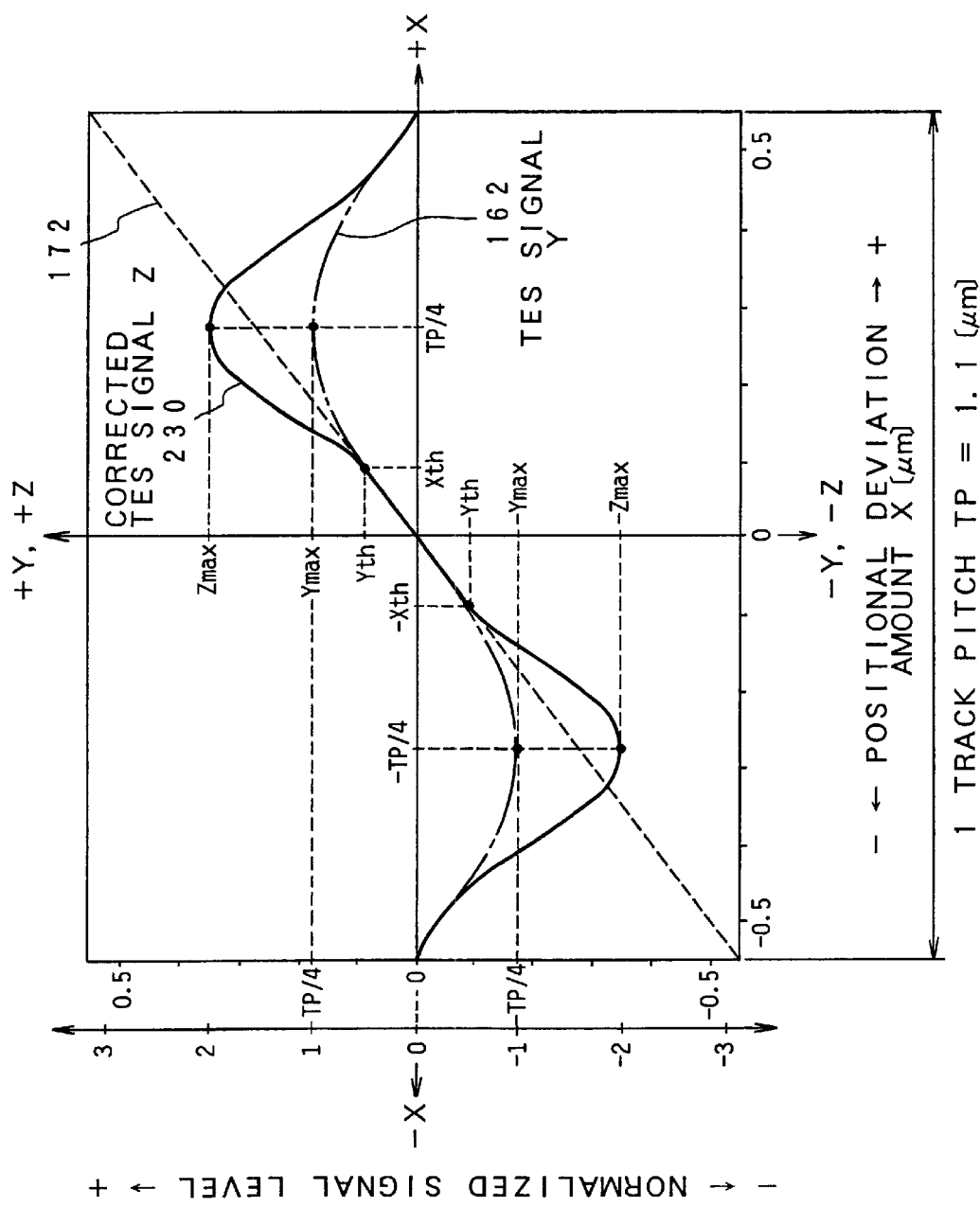
FIG. 20 is a characteristic diagram of the TES Y, ideal TES $Z_{desired}$, and correction TES Z in which a threshold value $Y_{th}$ is set to 50% of the maximum amplitude $Y_{max}$ according to the embodiment in which the correcting characteristics are simply decided by using a quadratic monomial equation.

(Correction of the TES by a monomial function) FIG. 20 is characterized in that as a non-linear function for correction which is set into the TES correcting unit 146 in FIG. 5, the sensitivity of the saturation region of the TES Y for the linear characteristics 172 of the positional deviation amount X is raised by using the Nth order monomial equation. The characteristics 162 of the TES Y approximately have a sine waveform and are saturated in a range out of the threshold values $\pm Y_{th}$ for the linear characteristics 172 and a separation is large. In the embodiment, therefore, as a non-linear function, by applying the $N_{th}$ order monomial equation to the sine waveform 162 of the TES Y in a range exceeding the threshold values $\pm Y_{th}$, the correction TES Z in which the sensitivity is raised is simply obtained. In the case where the threshold values $\pm Y_{th}$ are divided into three regions as sectional functions, the Nth order monomial which is used for correction of the TES is defined by the following general equation.

$$Z = \begin{cases} Y, & \text{if } |Y| \leq Y_{th} \\ Y^N / Y_{th}^{(N-1)}, & \text{if } Y_{th} < Y \\ -|Y|^N / Y_{th}^{(N-1)}, & \text{if } Y < -Y_{th} \end{cases} \quad (14)$$

where, $0 < Y_{th} \leq Y_{max}$

In the correcting process of the TES using the Nth order monomial equation (14), the degree N can be set to an arbitrary integer of 2 or more. In the invention, however, by setting the degree N to a quadratic or a cubic, the correction output of the correction TES Z whose amplitude is sufficiently emphasized is derived in the region where the TES Y is saturated. The track lead-in control can be properly performed with an enough feedback amount. If the degree N is set to a quartic or higher, it takes long time for an arithmetic operating process for correction and a large effect is not obtained as compared with the case of the quadratic or cubic. There is, consequently, no need to set the degree N to a quartic or more. Further, $1/Y_{th}^{(N-1)}$ is used to make characteristics 230 of the correction TES Z coincide with the values of the edge portions of a straight line by the threshold values $\pm Y_{th}$. The characteristics 230 of the correction TES Z are obtained in the case where the degree N=2 in the equation (14). Therefore, the following quadratic monomial equation is set.

$$Z = \begin{cases} Y, & \text{if } |Y| \le Y_{th} \\ Y^2/Y_{th}, & \text{if } Y_{th} < Y \\ -Y^2/Y_{th}, & \text{if } Y < -Y_{th} \end{cases} \quad (15)$$

As threshold values $Y_{th}$, $\pm 0.5 Y_{max}$ corresponding to 50% of the maximum amplitudes $\pm Y_{max}$ in the positional deviation amount $X=TP/4$ of the sine wave characteristics 162 of the TES Y are used. When the degree N=3, the following cubic monomial equation is set.

$$Z = \begin{cases} Y, & \text{if } |Y| \le Y_{th} \\ Y^3/Y_{th}^2, & \text{if } Y_{th} < Y \\ -|Y|^3/Y_{th}^2, & \text{if } Y < -Y_{th} \end{cases} \quad (16)$$

Figure 21:
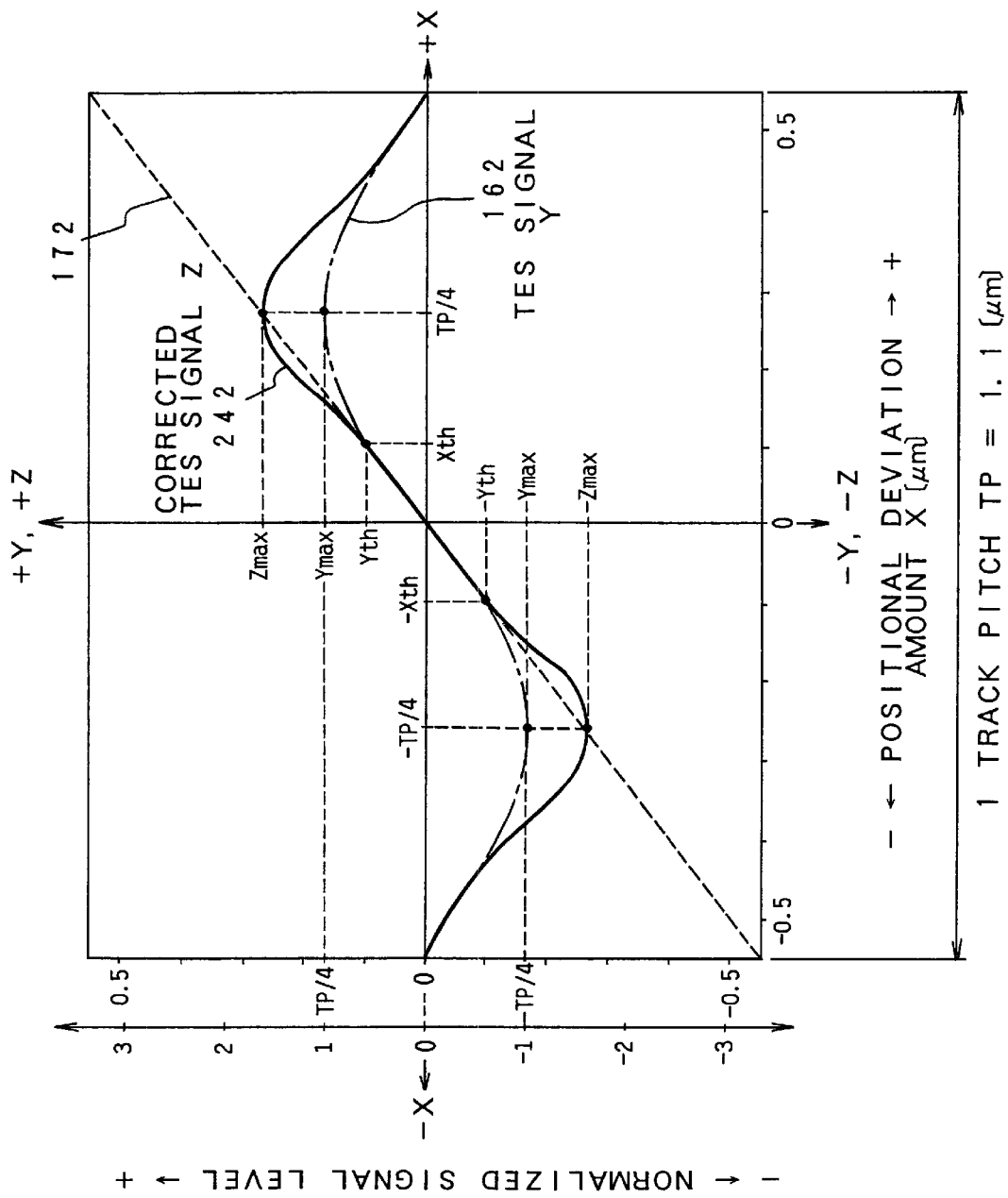
FIG. 21 is a characteristic diagram of the TES Y and correction TES Z in which the threshold value $Y_{th}$ is set to 65% of the maximum amplitude $Y_{max}$ according to the embodiment in which the correcting characteristics are simply determined by using a quadratic monomial equation.

FIG. 21 shows the case where the threshold value $Y_{th}$ in the equation (15) is set to $Y_{th}=0.65\, Y_{max}$ and is characterized in that with respect to the range exceeding 65% of the amplitude maximum values $\pm Y_{max}$ of the sine wave characteristics 162 of the TES Y, the correction by the quadratic monomial equation is executed, thereby obtaining characteristics 242 of the correction TES Z. The threshold values $\pm Y_{th}$ in this case are obtained as follows.

$$Y_{th}=0.65 \times Y_{max}=0.1138\, \mu m$$

Figure 22:
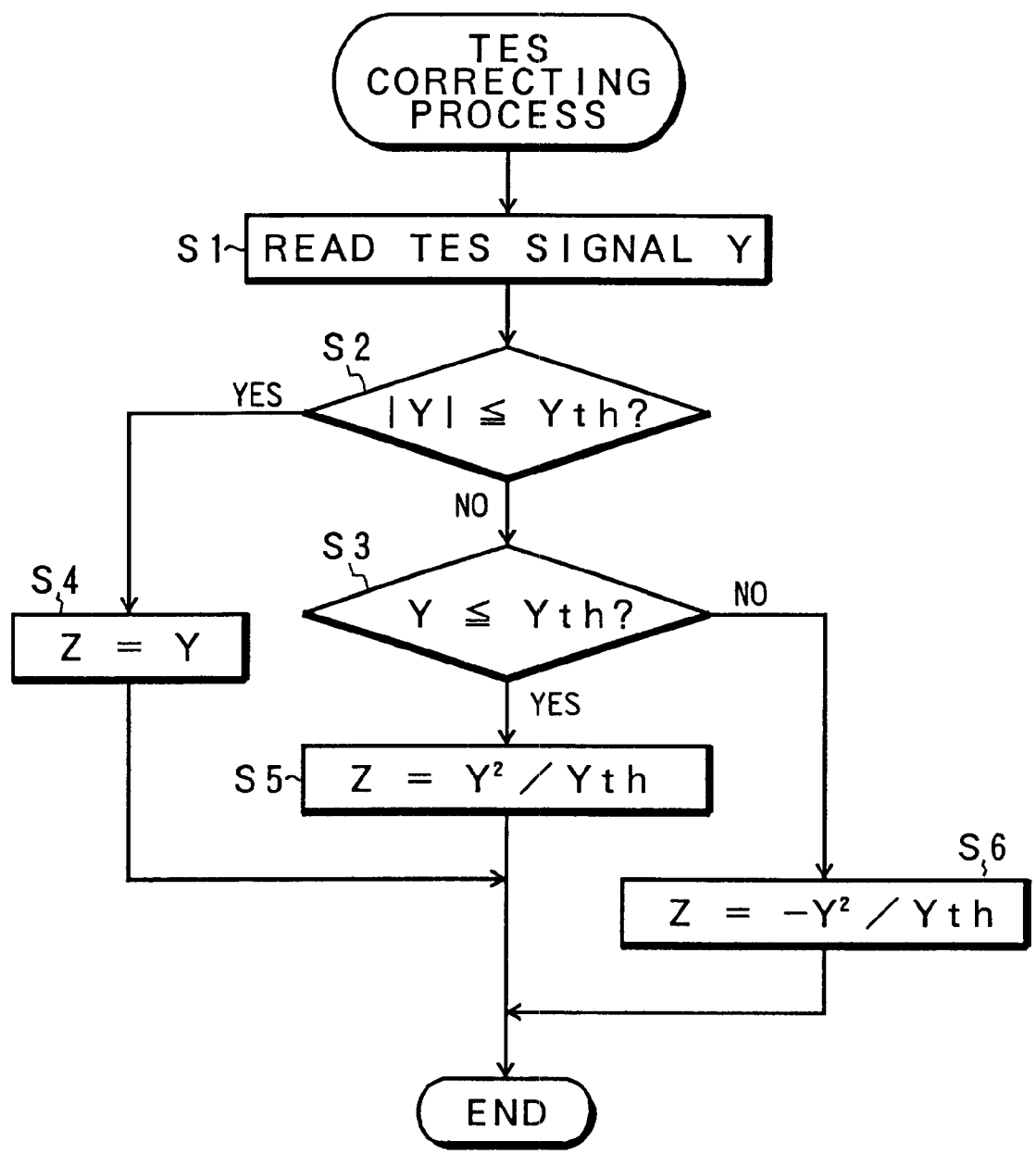
FIG. 22 is a flowchart for a TES correcting process using the correcting characteristics in FIG. 20.

FIG. 22 is a flowchart for the correcting process by the TES correcting unit 146 in FIG. 5 using the Nth order monomial equation. This correcting process is fundamentally the same as the correcting process in FIG. 9 using the Nth order polynomial except for a different point that the arithmetic operations for correction in steps S5 and S6 are executed by the Nth order monomial equations.

Figure 23A:
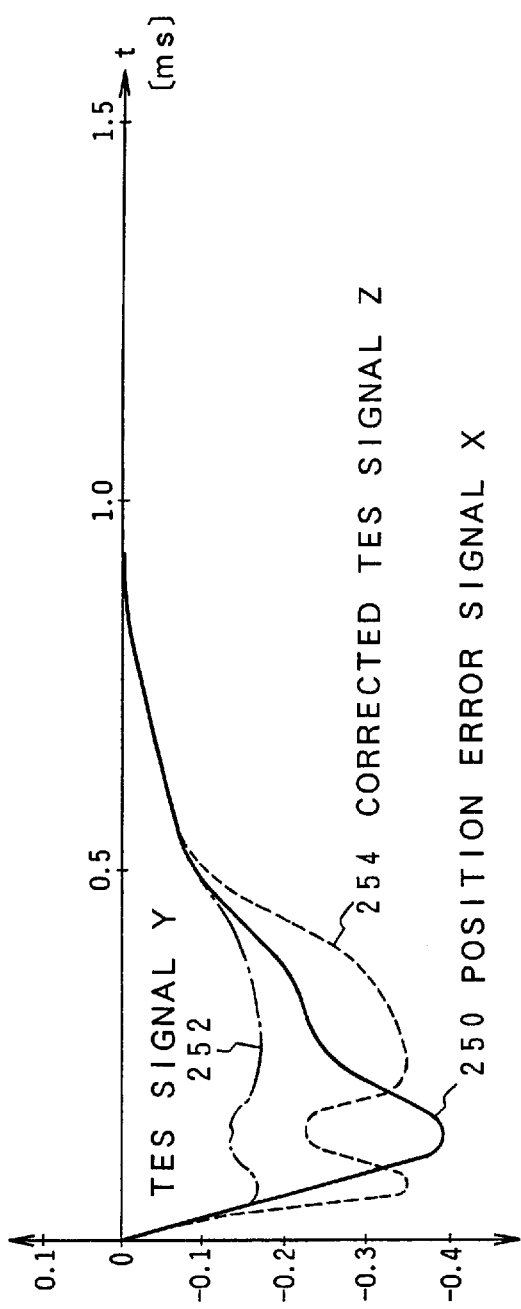
FIGS. 23A to 23C are time charts when the feedback signal is switched to the position error signal X, TES Y, and correction TES Z by the simulator in FIG. 10 and the lead-in control is performed.
Figure 23B:
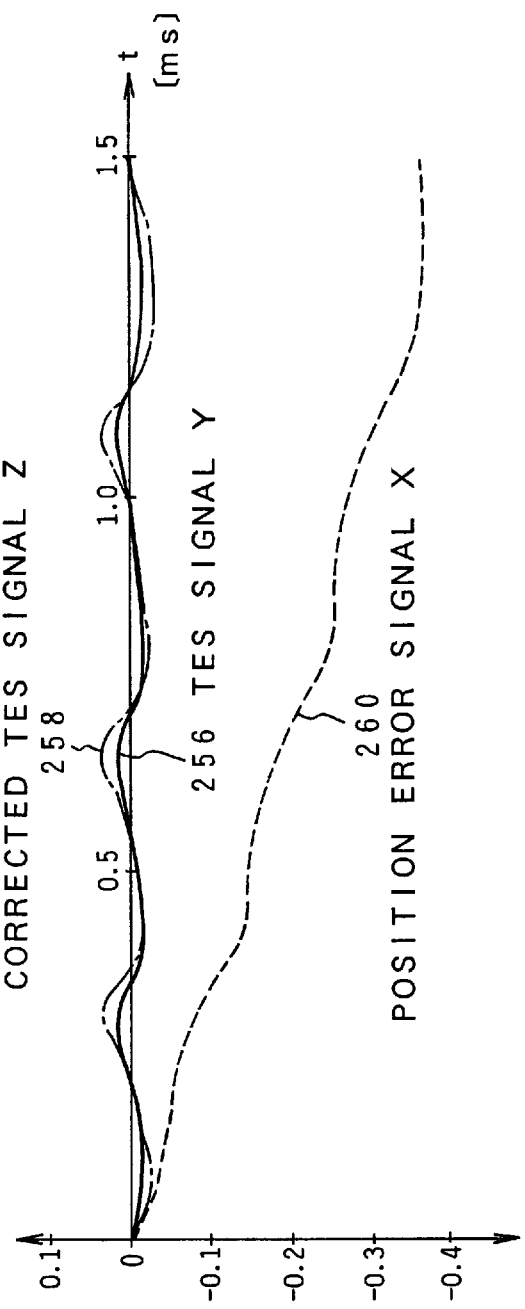
Figure 23C:
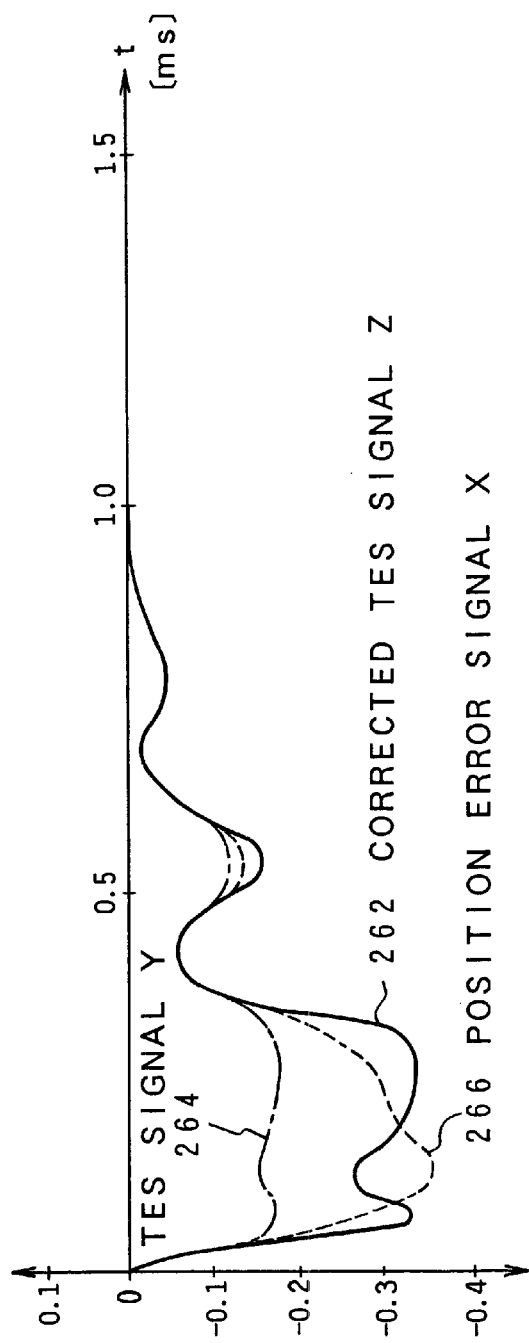

FIGS. 23A to 23C are time charts in the case where the quadratic monomial equation which is used for correction of FIG. 20 is set into the TES correcting unit 146 of the simulator in FIG. 10, the feedback signal is switched to the position error signal X, TES Y, and correction TES Z, and the lead-in control is executed, respectively. An initial speed error as a disturbance is set to 4 mm/sec by the speed error setting unit 180. FIG. 23A shows a case where a signal waveform 250 of the position error signal X from the pseudo carriage 171 is fed back to the FB arithmetic operating unit 154 by the switching circuit 148-1 of the simulator in FIG. 10. The laser beam is led to the track center in the convergence time of T=about 0.9 msec. A signal waveform 252 of the TES Y and a signal waveform 254 of the correction TES Z which are obtained in this instance are also shown by broken lines. FIG. 23B shows a case where the TES Y is always selected by the switching circuit 148-1 in FIG. 10 and is fed back to the FB arithmetic operating unit 154 and this control is the same as the conventional lead-in control. In this case, a feedback amount is insufficient like a signal waveform 256 of the TES Y, the laser beam cannot be led to the center of the target track, and the pickup is in a runaway state in which even if the laser beam passes the target track, the laser beam cannot be stopped. A signal waveform 258 of the correction TES Z and a signal waveform 260 of the position error signal X which are arithmetically operated in this instance are also shown by broken lines. FIG. 23C shows a case where the function of the TES correcting unit 146 in FIG. 10 is validated and a signal waveform 262 of the correction TES Z is inputted as a feedback signal to the FB arithmetic operating unit 154. In this case, like a signal waveform 262 of the correction TES Z, an emphasis of an enough amplitude component can be performed to a signal waveform 264 of the TES, its amplitude level is almost equal to that of a signal waveform 266 of the position error signal X, and the enough sensitivity is obtained. Therefore, the laser beam can be led to the track center in the convergence time of 0.9 msec that is almost equal to that in case of feeding back the signal waveform 250 of the position error signal X in FIG. 23A. The feedback of the signal waveform 250 of the position error signal X in FIG. 23A is a virtual operation which cannot be performed by the actual apparatus and is shown for comparison with the correcting process of the TES of the invention of FIG. 23C. According to the invention as mentioned above, the correction approximated by the Nth order polynomial or the non-linear function such as an Nth order monomial equation or the like is performed with respect to the saturation region of the TES and the correction to raise the detecting sensitivity is executed as for the saturation region of the TES. Therefore, in the lead-in control (position control) to lead the laser beam to the track center of the target track by the seek control, even if there is a variation in the initial speed when the lead-in control is started, by obtaining an enough feedback amount by the correction of the TES, the lead-in control to the track center can be certainly performed. The probability of the lead-in error is fairly reduced and the settlement time of the lead-in is reduced. The accessing performance in the pickup mechanism of the single driving type such that the laser beam is positioned by the movement of only the carriage by the driving of the VCM can be remarkably improved. Even in the tracking control for reading or writing after completion of the track lead-in control, when the TES enters the saturation region by the non-linear function, the correction to raise the detecting sensitivity is performed. Even in the tracking control, an enough feedback signal is derived. The occurrence of the off-track due to the disturbance such as a vibration or the like is certainly prevented. Even if an off-track occurs by receiving a shock, the apparatus can be soon returned to the on-track state.

According to the above embodiment, the non-linear function for the TES correction is approximated by the Nth order monomial equation, Nth order polynomial, or the like. However, for instance, it is also possible to prepare the correcting characteristics 210 in FIG. 15 as a reference table into an RAM and to obtain the correction TES Z corresponding to the TES Y with reference to this table.

The invention is not limited by the numerical values in the embodiment but many proper modifications and variations are possible within a range in which the objects and advantages of the invention are not lost.

What is claimed is:

1. An optical storing apparatus comprising:
   a pickup for moving an irradiating position of a laser beam to an arbitrary track position on a medium;
   an information signal processing unit for reproducing at least information to said medium by said laser beam;
   a position signal detecting unit for detecting a position signal Y according to a positional deviation amount X in which a track center of fie medium is set to 0 on the basis of return light of said laser beam from the medium;
   a position signal correcting unit for outputting a corrected position signal Z obtained by correcting detection sensitivity characteristics for said positional deviation amount to desired characteristics by performing a correcting arithmetic operation using a predetermined non-linear function on the basis of said position signal Y; and a positioning control unit for performing control such that said laser beam is moved toward a target track of said medium and the laser beam is lead-n controlled to the center of the target track by switching a control mode to a position servo control at a position just before the target track and the laser beam is allowed to trace the target track after completion of the lead in control, wherein said corrected position signal Z is used for at least one of said lead-in control and said tracing of said target track.

2. An apparatus according to claim 1, wherein said position signal correcting unit defines an ideal position signal $Z_{desired}$ as a desired position signal for an actual positional deviation amount X of said laser beam, executes a correcting arithmetic operation using a predetermined non-linear function to said position signal Y, and outputs the corrected position signal Z which is approximated to or coincided with said ideal position signal $Z_{desired}$.

3. An apparatus according to claim 2, wherein when an absolute value of the position signal Y detected by said position signal detecting unit is equal to or larger than a predetermined threshold value $Y_{th}$, said position signal correcting unit executes a correcting arithmetic operation using a predetermined non-linear function to said position signal Y, thereby calculating the corrected position signal Z.

4. An apparatus according to claim 2, wherein said position signal correcting unit sets an Nth order polynomial $$Z=a_N Y^N+a_{N-1}Y^{N-1}+\ldots+a_2Y^2+a_1Y+a_0$$

as said non-linear function and substitutes said position signal Y into said Nth order polynomial, thereby calculating the corrected position signal Z.

5. An apparatus according to claim 2, wherein when a threshold value $Y_{th}$ of a positive value is set to a predetermined value which is equal to or smaller than a maximum amplitude of the position signal Y, said position signal correcting unit calculates said corrected position signal Z by $$Z=K_{YZ} \cdot Y$$

in a range $(|Y| \leq Y_{th})$ where an absolute value $|Y|$ of said position signal Y is equal to or smaller than the threshold value $Y_{th}$, calculates the corrected position signal Z by substituting said position signal Y into an Nth order polynomial $$Z=a_N Y^N+a_{N-1}Y^{N-1}+\ldots+a_2Y^2+a_1Y+a_0$$

in a range $(Y_{th}<Y)$ where said position signal Y exceeds said threshold value $Y_{th}$ of a positive value, and calculates the corrected position signal Z by substituting said position signal Y into an Nth order polynomial $$Z=-(a_N|Y|^N+a_{N-1}|Y|^{N-1}+\ldots+a_2Y^2+a_1|Y|+a_0)$$

in a range $(Y<-Y_{th})$ where said position signal Y is smaller than said threshold value $-Y_{th}$ of a negative value.

6. An apparatus according to claim 4, wherein said position signal correcting unit calculates the corrected position signal Z by substituting said position signal Y into a quadratic polynomial $$Z=a_2Y^2+a_1Y+a_0$$

in a range $(Y_{th}<Y)$ where said position signal Y exceeds a threshold value $Y_{th}$ of a positive value, and calculates the corrected position signal Z by substituting said position signal Y into a quadratic polynomial $$Z=-(a_2Y^2+a_1|Y|+a_0)$$

in a range $(Y<-Y_{th})$ where said position signal Y is smaller than said threshold value $-Y_{th}$ of a negative value.

7. An apparatus according to claim 2, wherein said position signal correcting unit uses linear characteristics of $$Z_{desired}=K_{XZ} \cdot X$$

as said ideal position signal $Z_{desired}$.

8. An apparatus according to claim 2, wherein as said ideal position signal $Z_{desired}$, said position signal correcting unit uses linear characteristics of $$Z_{desired}=K_{XZ} \cdot X$$

in a range $(|X| \leq X_{th})$ where an absolute value $|X|$ of said positional deviation amount X lies within a threshold value $X_{th}$, uses non-linear characteristics of $$Z_{desired}=K_{XZ} \cdot X+K_{NL}(X-X_{th})^n$$

in a range $(X_{th}<X)$ where said positional deviation amount X exceeds said threshold value $X_{th}$ of a positive value, and, further, uses non-linear characteristics of $$Z_{desired}=-\{K_{XZ} \cdot |X|+K_{NL}(|X|-X_{th})^n\}$$

in a range $(X<-X_{th})$ where said positional deviation amount X is smaller than said threshold value $-X_{th}$ of a negative value.

9. An apparatus according to claim 1, wherein the non-linear function in said position signal correcting unit is prepared as a table and a correction is executed by referring to said table.

10. An apparatus according to claim 1, wherein said position signal correcting unit sets an Nth order monomial equation as said non-linear function and substitutes said position signal Y into said Nth order monomial equation, thereby calculating the corrected position signal Z.

11. An apparatus according to claim 10, wherein when a threshold value $Y_{th}$ is set to a value $(Y_{max} \cdot K_{th})$ obtained by multiplying a maximum amplitude $Y_{max}$ of the position signal Y by a positive coefficient $K_{th}$ of 1 or smaller, said position signal correcting unit calculates said corrected position signal Z by $$Z=Y$$

in a range $(|Y| \leq Y_{th})$ where an absolute value $|Y|$ of said position signal Y is equal to or smaller than the threshold value $Y_{th}$, calculates the corrected position signal Z by substituting said position signal Y into an Nth order monomial equation $$Z=Y^N/Y_{th}^{(N-1)}$$

in a range $(Y_{th}<Y)$ where said position signal Y exceeds said threshold value $Y_{th}$ of a positive value, and calculates the corrected position signal Z by substituting said position signal Y into an Nth order monomial equation $$Z=-|Y|^N/Y_{th}^{(N-1)}$$

in a range $(Y<-Y_{th})$ where said position signal Y is smaller than said threshold value $-Y_{th}$ of a negative value.

12. An apparatus according to claim 11, wherein said position signal correcting unit calculates the corrected position signal Z by substituting said position signal Y into a quadratic monomial equation $$Z=Y^2/Y_{th}$$

in a range $(Y_{th}<Y)$ where said position signal Y exceeds said threshold value $Y_{th}$ of a positive value and calculates the corrected position signal Z by substituting said position signal Y into a quadratic monomial equation $$Z=-Y^2/Y_{th}$$

in a range $(Y<-Y_{th})$ where said position signal Y is smaller than said threshold value $-Y_{th}$ of a negative value.

13. An apparatus according to claim 10, wherein said position signal correcting unit calculates the corrected position signal Z by substituting said position signal Y into a cubic monomial equation $$Z=Y^3/Y_{th}^2$$

in a range $(Y_{th}<Y)$ where said position signal Y exceeds a threshold value $Y_{th}$ of a positive value and calculates the corrected position signal Z by substituting said position signal Y into a cubic monomial equation $$Z=-|Y|^3/Y_{th}^2$$

in a range $(Y<-Y_{th})$ where said position signal Y is smaller than said threshold value $-Y_{th}$ of a negative value.

* * * * *

UNITED STATES PATENT AND TRADEMARK OFFICE
CERTIFICATE OF CORRECTION

PATENT NO.    : 6,341,107  
DATED         : January 22, 2002  
INVENTOR(S)   : Ichiro Watanabe It is certified that error appears in the above-identified patent and that said Letters Patent is hereby corrected as shown below:

<u>Claims,</u>
Claim 1, Line 20, delete the word "lead-n" and insert -- lead-in -- therefor.

Signed and Sealed this

Second Day of July, 2002

*Attest:*

*Attesting Officer*

JAMES E. ROGAN  
*Director of the United States Patent and Trademark Office*